US012770969B2

(12) United States Patent
Liang et al.

(10) Patent No.: US 12,770,969 B2
(45) Date of Patent: Oct. 20, 2026

(54) END CAP ASSEMBLY, BATTERY CELL, BATTERY, AND ELECTRICAL DEVICE

(71) Applicant: JIANGSU CONTEMPORARY AMPEREX TECHNOLOGY LIMITED, Changzhou (CN)

(72) Inventors: Chengdu Liang, Changzhou (CN); Shoujun Huang, Changzhou (CN); Xinxiang Chen, Changzhou (CN); Yulian Zheng, Changzhou (CN); Peng Wang, Changzhou (CN); Wei Li, Changzhou (CN)

(73) Assignee: JIANGSU CONTEMPORARY AMPEREX TECHNOLOGY LIMITED, Changzhou (CN)

( * ) Notice: Subject to any disclaimer, the term of this patent is extended or adjusted under 35 U.S.C. 154(b) by 947 days.

(21) Appl. No.: 18/069,237

(22) Filed: Dec. 21, 2022

(65) Prior Publication Data

US 2023/0125313 A1 Apr. 27, 2023

Related U.S. Application Data

(63) Continuation of application No. PCT/CN2021/112790, filed on Aug. 16, 2021.

(30) Foreign Application Priority Data

Sep. 21, 2020 (CN) ........................ 202010991769.X

(51) Int. Cl.

*H01M 50/325* (2021.01)
*H01M 50/103* (2021.01)
(Continued)

(52) U.S. Cl.

CPC ....... *H01M 50/325* (2021.01); *H01M 50/103* (2021.01); *H01M 50/166* (2021.01);
(Continued)

(58) Field of Classification Search

CPC ............. H01M 50/325; H01M 50/655; H01M 50/103; H01M 50/668; H01M 50/317;
(Continued)

(56) References Cited

U.S. PATENT DOCUMENTS 4,603,093 A * 7/1986 Edwards ........... H01M 10/0468 429/208
2001/0031390 A1* 10/2001 Schwarz ............. H01M 50/308 429/89
(Continued)

FOREIGN PATENT DOCUMENTS

CN 201796967 U 4/2011
CN 102959785 A 3/2013
(Continued)

OTHER PUBLICATIONS

CN205790148 Wang machine translation to English from Espacenet.com (Year: 2025).*
(Continued)

*Primary Examiner* — Barbara L Gilliam
*Assistant Examiner* — Lawrence La Raia, III
(74) *Attorney, Agent, or Firm* — K&L Gates LLP

(57) ABSTRACT

An end cap assembly, a battery cell, a battery, and an electrical device are provided. The end cap assembly is applicable to a battery cell. The end cap assembly includes: an end cap body; a pressure relief component, connected to the end cap body, where a first through-hole configured to inject an electrolytic solution is made on the pressure relief component, and the pressure relief component is configured to be actuated when an internal pressure of the battery cell reaches a threshold, so as to release the internal pressure of the battery cell; and a closing component, detachably disposed on the pressure relief component, where the closing component is configured to close the first through-hole.

20 Claims, 11 Drawing Sheets

(51) Int. Cl.

| | |
|---|---|
| ***H01M 50/166*** | (2021.01) |
| ***H01M 50/317*** | (2021.01) |
| ***H01M 50/60*** | (2021.01) |
| ***H01M 50/618*** | (2021.01) |
| ***H01M 50/627*** | (2021.01) |
| ***H01M 50/655*** | (2021.01) |

(52) U.S. Cl.
CPC ....... *H01M 50/317* (2021.01); *H01M 50/618* (2021.01); *H01M 50/627* (2021.01); *H01M 50/655* (2021.01); *H01M 50/668* (2021.01); *H01M 2220/20* (2013.01); *Y02E 60/10* (2013.01)

(58) Field of Classification Search
CPC .. H01M 50/166; H01M 2220/20; Y02E 60/10
See application file for complete search history.

(56) References Cited

U.S. PATENT DOCUMENTS

| | | | | |
|---|---|---|---|---|
| 2003/0113612 | A1* | 6/2003 | Jones .................. | H01M 50/394 429/57 |
| 2005/0221174 | A1 | 10/2005 | Yoon | |
| 2014/0315050 | A1* | 10/2014 | Li ....................... | H01M 50/342 429/56 |
| 2022/0336912 | A1* | 10/2022 | Morii .................. | H01M 50/308 |

FOREIGN PATENT DOCUMENTS

| | | | |
|---|---|---|---|
| CN | 205790148 | U | 12/2016 |
| CN | 205921001 | U | 2/2017 |
| CN | 210136896 | U | 3/2020 |
| CN | 210403786 | U | 4/2020 |
| CN | 211350706 | U | 8/2020 |
| CN | 111933833 | A | 11/2020 |
| JP | 2010086776 | A | 4/2010 |
| JP | 2013254660 | A | 12/2013 |
| JP | 2014075279 | A | 4/2014 |
| JP | 2014075280 | A | 4/2014 |
| JP | 2014107147 | A | 6/2014 |
| JP | 2015210877 | A | 11/2015 |
| JP | 2016171058 | A | 9/2016 |
| KR | 20050096291 | A | 10/2005 |

OTHER PUBLICATIONS

International Search Report received in the corresponding International Application PCT/CN2021/112790, mailed Nov. 18, 2021.

Written Opinion received in the corresponding International Application PCT/CN2021/112790, mailed Nov. 18, 2021.

First Office Action received in the corresponding Chinese Application CN202010991769.X, mailed Nov. 25, 2020.

First Search Report received in the corresponding Chinese Application CN202010991769.X, mailed Nov. 20, 2020.

Extended European search report received in the corresponding European Application 21868372.0, mailed Oct. 10, 2023.

Notice of Reasons for Refusal received in the corresponding Japanese Application 2022-561636, mailed Nov. 28, 2023.

Notice of Allowance (with English Machine Translation), mailed Aug. 6, 2025, for corresponding Korean Patent Application Serial No. 10-2022-7033900.

* cited by examiner

FIG. 1-D

S101: Inject an electrolytic solution through a first through-hole 21 on an explosion-proof component 2 of a secondary battery 400, where the pressure relief component 2 is disposed on a sidewall of a shell 410'

↓

S102: Mount a closing component 3 onto the pressure relief component 2 to close the first through-hole 21

END CAP ASSEMBLY, BATTERY CELL, BATTERY, AND ELECTRICAL DEVICE

CROSS-REFERENCE TO RELATED APPLICATIONS

This application is a continuation of International Application PCT/CN2021/112790, filed on Aug. 16, 2021, which claims priority to Chinese Patent Application No. 202010991769.X, filed on Sep. 21, 2020 and entitled "END CAP ASSEMBLY, BATTERY CELL, BATTERY, AND ELECTRICAL DEVICE", which is incorporated herein by reference in its entirety.

TECHNICAL FIELD

This disclosure relates to the technical field of batteries, and in particular, to an end cap assembly, a housing assembly, a battery cell, a battery, and an electrical device.

BACKGROUND

Due to advantages such as a high energy density, a high power density, reusability for many cycles, a long shelf life, batteries such as lithium-ion batteries have been widely used in electric vehicles.

However, increasing the battery life of electric vehicles has always been a tricky problem in the industry.

SUMMARY

An objective of this disclosure is to improve performance of lithium-ion batteries.

According to a first aspect of this disclosure, an end cap assembly is provided, including:

- an end cap body;
- a pressure relief component, connected to the end cap body, where a first through-hole configured to inject an electrolytic solution is made on the pressure relief component, and the pressure relief component is configured to be actuated when an internal pressure of the battery cell reaches a threshold, so as to release the internal pressure of the battery cell; and
- a closing component, detachably disposed on the pressure relief component, where the closing component is configured to close the first through-hole.

In the end cap assembly according to this embodiment, the first through-hole configured to inject the electrolytic solution is made on the pressure relief component, and the first through-hole is closed by the closing component. The closing component is detachably disposed on the pressure relief component so as to implement detachment between the closing component and the pressure relief component to enable electrolyte refilling, thereby effectively alleviating capacity fading of the battery cell and improving the service life of the battery cell. Moreover, the first through-hole located on the pressure relief component can implement functions of both electrolyte refilling and release of the internal pressure of the battery cell, reduce the area occupied by the components on the end cap body, and vacate more space for battery assembling and circuit layout.

In some embodiments, the end cap assembly further includes: an insulation piece, disposed on a side that is of the end cap body and that is close to an interior of the battery cell, where the insulation piece abuts on the pressure relief component to support the pressure relief component.

The end cap assembly according to this embodiment abuts on the pressure relief component through the insulation piece, so as to support the pressure relief component and equalize an external force received by the pressure relief component. This prevents the pressure relief component from being damaged during detachment and attachment of the closing component, improves reliability of the battery cell during electrolyte refilling, and increases the service life of the battery cell.

In some embodiments, a snap-fit structure is disposed between the pressure relief component and the insulation piece. The snap-fit structure is configured to limit torsional deformation of the pressure relief component with respect to the end cap body along a circumference of the pressure relief component.

In the end cap assembly according to this embodiment, the snap-fit structure is disposed between the insulation piece and the pressure relief component to equalize a circumferential external force received by the pressure relief component. This prevents the pressure relief component from being damaged during detachment and attachment of the cover body, improves reliability of the battery cell during electrolyte refilling, and increases the service life of the battery cell.

In some embodiments, the snap-fit structure includes a first protruding portion and a recessed portion that fit with each other. The first protruding portion is disposed on a surface that is of the pressure relief component and that is oriented toward the insulation piece. The recessed portion is disposed on a surface that is of the insulation piece and that is oriented toward the pressure relief component.

In this embodiment, the snap-fit structure with the protruding portion fitted with the recessed portion enables the insulation piece to exert a reliable circumferential restraint effect on the pressure relief component, and prevents torsional deformation of the pressure relief component along the circumference of the pressure relief component with respect to the end cap body, so as to reduce the force received at an actuation mechanism or a fragile structure of the pressure relief component, and improve structural stability of the pressure relief component.

In some embodiments, a plurality of snap-fit structures are disposed. The plurality of snap-fit structures are evenly distributed circumferentially around an axis of the pressure relief component.

In this embodiment, a plurality of snap-fit structures are evenly distributed circumferentially around the axis of the pressure relief component. In this way, a circumferential supporting force exerted by the insulation piece on the pressure relief component is more equalized during electrolyte refilling after the cover body is unscrewed, and the circumferential external force received by the pressure relief component is equalized along the entire circumferential direction. This improves the effect of protecting the pressure relief component during detachment and attachment of the cover body, prevents the pressure relief component from being damaged during detachment and attachment of the cover body, improves reliability of the battery cell during electrolyte refilling, and increases the service life of the battery cell.

In some embodiments, a positioning hole is made on an outer surface of the pressure relief component. The positioning hole is configured to assist in positioning the pressure relief component during closing of the first through-hole.

In this embodiment, during assembling of the end cap assembly or electrolyte refilling, tooling may be inserted into the positioning hole to provide a clamping force for the pressure relief component, so as to reduce the external force received by the pressure relief component along the thickness or circumference of the pressure relief component, prevent the pressure relief component from being stressed at the actuation mechanism or fragile structure, and improve the structural stability of the pressure relief component.

In some embodiments, the first through-hole is located at a center position of the pressure relief component.

This embodiment equalizes a radial width of the pressure relief component at a part outside the first through-hole, so as to equalize strength of the pressure relief component along the entire circumferential direction, prevent the pressure relief component from being actuated when the internal pressure of the battery cell does not reach the threshold, and improve safety of the battery cell in use. Moreover, this prevents an unequal force from being exerted on the entire circumferential direction of the pressure relief component during detachment and attachment of the closing component, and improves structural stability of the pressure relief component during detachment and attachment of the closing component.

In some embodiments, the pressure relief component includes an explosion-proof valve. The first through-hole is made on the explosion-proof valve.

This embodiment reduces difficulty of processing the explosion-proof valve, helps increase the area of the explosion-proof valve, and increases the pressure on the pressure relief component on condition that the internal air pressure of the battery cell remains constant. In this way, in a case that the battery cell is thermally runaway, gas in the battery cell can be quickly expelled, thereby improving safety of the battery cell in use.

In some embodiments, the explosion-proof valve includes:

- a first portion, taking a shape of an annular structure, where the first portion includes a fragile region, the fragile region extends along a circumference of the explosion-proof valve, and the fragile region is configured to be actuated when the internal pressure of the battery cell reaches the threshold, so as to release the internal pressure of the battery cell; and
- a second portion, disposed inside the first portion along a radius of the explosion-proof valve, where a thickness of the second portion is greater than a thickness of the first portion.

The explosion-proof valve according to this embodiment adopts a thickness-varying structure, thereby making it convenient to not only dispose the fragile region on the explosion-proof valve, but also partially thicken a region in which the first through-hole is located, so as to design a connection structure between the closing component and the explosion-proof valve and increase the connection strength between the closing component and the explosion-proof valve, and in turn, improve reliability of design of integrating an electrolyte injection member with the pressure relief component.

In some embodiments, the explosion-proof valve further includes: a transition portion, connected between the first portion and the second portion along the radius of the explosion-proof valve.

In the explosion-proof valve according to this embodiment, the transition component is disposed between the first portion and the second portion, thereby implementing smooth transition between the first portion and the second portion, reducing the probability of stress concentration in the thickness-varying region, and in turn, improving the overall strength of the explosion-proof valve, and reducing the probability of deforming or damaging the explosion-proof valve during detachment and attachment of the closing component.

In some embodiments, the end cap assembly further includes: an insulation piece, disposed on a side that is of the end cap body and that is close to an interior of the battery cell, where a second through-hole is made on the insulation piece, and the second through-hole is configured to implement communication between the interior of the battery cell and the fragile region.

In this embodiment, the second through-hole is made on the insulation piece to form a passageway available for the gas inside the battery cell to reach the fragile region. In this way, when the internal pressure of the battery cell exceeds the threshold, the internal pressure or heat can be smoothly released through the explosion-proof valve, thereby improving safety of battery cell in use.

In some embodiments, a first groove is made on a surface that is of the insulation piece and that is oriented toward the end cap body. The second portion extends into the first groove.

In this embodiment, the second portion extends into the first groove, thereby maximally avoiding increase of the overall thickness of the end cap assembly on the basis of increasing the strength of the explosion-proof valve, thereby increasing the energy density without changing the size of the battery cell.

In some embodiments, the pressure relief component includes a plurality of explosion-proof valves. The plurality of explosion-proof valves are disposed independently at intervals along a periphery of the first through-hole.

In this embodiment, the first through-hole and the explosion-proof valve are disposed independently. Therefore, the thickness of a joint between the first through-hole and the explosion-proof valve is consistent with the thickness of the end cap body, thereby ensuring sufficient structural strength of the joint. In addition, the fragile region of the explosion-proof valve is independent of the electrolyte injection mechanism, so that the external force generated during detachment and attachment of the closing component is prevented from directly acting on the explosion-proof valve during the assembling of the end cap assembly or the electrolyte refilling, and the fragile region of the explosion-proof valve is prevented from being deformed or damaged.

In some embodiments, a plurality of second grooves are disposed on the pressure relief component. The second grooves form the explosion-proof valves. The explosion-proof valves include a fragile region. The fragile region is configured to be actuated when the internal pressure of the battery cell reaches the threshold, so as to release the internal pressure of the battery cell.

In this embodiment, the plurality of second grooves are disposed to form a plurality of independent explosion-proof valves to facilitate arrangement of the fragile region. In addition, the fragile region of the explosion-proof valves is independent of the electrolyte injection mechanism, so that the external force generated during detachment and attachment of the closing component is prevented from directly acting on the explosion-proof valves during the assembling of the end cap assembly or the electrolyte refilling, and the fragile region of the explosion-proof valves is prevented from being deformed or damaged.

In some embodiments, the pressure relief component is integrated with the end cap body.

In the structure provided in this embodiment, the pressure relief component is integrated with the end cap body, thereby increasing the connection strength between the pressure relief component and the end cap body, and saving a step of fixing the pressure relief component onto the end cap body. This reduces the manufacturing difficulty and cost of the end cap assembly, and prevents an actuating pressure on the explosion-proof valve from being affected by a welding stress generated when the fixing manner is welding or the like.

In some embodiments, a third through-hole is made on the end cap body. The pressure relief component is fixed inside the third through-hole.

In this embodiment, an independent pressure relief component is fixed to the end cap body, thereby reducing the manufacturing difficulty. The pressure relief component can be formed by stamping in advance and then fixed to the end cap body. In this way, poorly stamped parts in the pressure relief component can be eliminated, thereby reducing the reject rate of assembled finished products and reducing the production cost of products.

In some embodiments, a locking base is disposed on a hole wall of the third through-hole. The locking base is disposed on a side that is of the end cap body and that is close to an interior of the battery cell. The pressure relief component abuts against the locking base to connect to the end cap body.

In this embodiment, the pressure relief component abuts against the locking base from inside. The locking base may serve as a main body for bearing the air pressure, thereby reducing the force on the joint between the pressure relief component and the end cap body, reducing the probability of seal failure caused by a creep of the joint between the pressure relief component and the end cap body after long-term use of the battery cell, and increasing the service life of the battery cell.

In some embodiments, the end cap assembly further includes a protection sheet. The protection sheet is affixed to a surface that is of the pressure relief component and that is away from the interior of the battery cell.

This embodiment prevents external impurities or moisture from entering the battery cell through the closing component, and improves airtightness of the end cap assembly.

In some embodiments, the closing component includes:

a sealing element, configured to seal the first through-hole; and a cover body, configured to cover at least a part of the sealing element, where the cover body is configured to be detachable by rotating.

In some embodiments, an accommodation portion is further disposed on the pressure relief component. The accommodation portion is disposed on the pressure relief component and disposed along a circumference of the first through-hole. The cover body includes a limiting portion.

When the cover body rotates to a first position, the limiting portion is located in the accommodation portion to restrict the cover body from detaching from the pressure relief component. When the cover body rotates to a second position, the limiting portion is staggered from the accommodation portion along the circumference of the first through-hole to implement detachment between the cover body and the pressure relief component.

In this embodiment, the first through-hole is opened and closed by rotating the cover body, so as to form a detachable structure between the cover body and the pressure relief component, and prevent the electrolyte injection structure from being damaged during opening of the cover body. Further, the first through-hole can be reliably closed after completion of electrolyte refilling, thereby ensuring reliability of the battery cell in use after the electrolyte refilling. Therefore, the appearance of the secondary battery cell remains the same as before the electrolyte refilling, without affecting the use of the battery cell after the electrolyte refilling. Moreover, because the first through-hole is closed by directly rotating the cover body, the sealing of the first through-hole is implemented without laser welding, thereby saving a step of cleaning the first through-hole before the laser welding, and improving the production efficiency of the battery cell. In addition, the first through-hole is opened and closed by rotating the cover body, thereby reducing the large external force exerted on the pressure relief component along the thickness during detachment and attachment of the cover body, and preventing the pressure relief component from deforming inward or outward.

In some embodiments, the cover body further includes a body portion. The body portion is configured to cover at least a part of the sealing element. The limiting portion is connected to the body portion and extends along a radius of the first through-hole.

In some embodiments, the pressure relief component further includes a guide portion. The guide portion communicates with the accommodation portion. The limiting portion is configured to enter the accommodation portion through the guide portion, or detach from the pressure relief component through the guide portion.

In some embodiments, the pressure relief component includes a pressure relief body and a mounting component. The mounting component is disposed on a surface of the pressure relief body and disposed around the first through-hole. The accommodation portion is disposed in the mounting component, or the accommodation portion is formed by being enclosed with the mounting component and the pressure relief body.

In this embodiment, the pressure relief component is designed as a discrete structure. The pressure relief component is in a thin plate-like structure on which a complex structure is hardly processible. Therefore, the mounting component disposed facilitates formation of the accommodation portion, and reduces the processing difficulty of the pressure relief component.

According to a second aspect of this disclosure, a housing assembly is provided, applicable to a battery cell and including:

a housing;

a pressure relief component, connected to a sidewall of the housing, where a first through-hole configured to inject an electrolytic solution is made on the pressure relief component, and the pressure relief component is configured to be actuated when an internal pressure of the battery cell reaches a threshold, so as to release the internal pressure of the battery cell; and a closing component, detachably disposed on the housing, where the closing component is configured to close the first through-hole.

According to a third aspect of this disclosure, a battery cell is provided, including:

an electrode assembly and a shell configured to accommodate the electrode assembly, where the shell includes a housing and, in some embodiments, the housing includes an end opening, and the end cap assembly covers the end opening of the housing; or an electrode assembly and a shell configured to accommodate the electrode assembly, where the shell includes an end cap body and, in some embodiments, the housing includes an end opening, and the end cap body covers the end opening of the housing.

According to a fourth aspect of this disclosure, a battery is provided, including the battery cell according to the foregoing embodiments.

According to a fifth aspect of this disclosure, an electrical device is provided, including the battery cell according to the foregoing embodiment, where the battery cell is configured to provide electrical energy.

According to a sixth aspect of this disclosure, an electrolyte injection method of a battery cell is provided, including:

injecting an electrolytic solution through a first through-hole on a pressure relief component of the battery cell, where the pressure relief component is disposed on a sidewall of a shell, and the pressure relief component is configured to be actuated when an internal pressure of the battery cell reaches a threshold, so as to release the internal pressure of the battery cell; and mounting a closing component onto the pressure relief component to close the first through-hole.

In some embodiments, the closing component includes: a sealing element and a cover body. The sealing element is configured to seal the first through-hole. The cover body is configured to cover at least a part of the sealing element. The mounting a closing component onto the pressure relief component to close the first through-hole includes:

placing the cover body on the pressure relief component, where the cover body covers at least a part of the sealing element, the cover body is placed in a second position, and a limiting portion of the cover body is staggered, along a circumference of the first through-hole, from an accommodation portion located on a side that is of the shell and that is away from an interior of the shell; and rotating the cover body from the second position to a first position, so that the limiting portion enters the accommodation portion to restrict the cover body from detaching from the pressure relief component.

This embodiment not only avoids the welding step, but also avoids a plurality of subsequent steps such as cleaning up the weld-induced welding spatters and drying the liquid that remains after the cleaning. Therefore, this disclosure can improve the production efficiency of the battery cell. In this disclosure, the closing component is mounted on the pressure relief component to close the first through-hole, and the electrolyte injection member is integrated with the pressure relief component to achieve space efficiency and facilitate electrolyte refilling operations.

In some embodiments, the electrolyte injection method of a battery cell further includes:

rotating the cover body from the first position to the second position, so that the limiting portion is staggered from the accommodation portion along the circumference of the first through-hole; and detaching the cover body from the pressure relief component.

This embodiment can implement flexible and convenient detachment of the cover body. Therefore, when the electrolytic solution is deficient or deteriorated, the closing component is conveniently detachable for electrolyte refilling or degassing in the battery cell.

In some embodiments, the electrolyte injection method of a battery cell further includes: assisting, during closing of the first through-hole, in positioning the pressure relief component through a positioning hole located on an outer surface of the pressure relief component.

In this embodiment, during assembling of the battery cell or electrolyte refilling, tooling may be inserted into the positioning hole to provide a clamping force for the pressure relief component, so as to reduce the external force received by the pressure relief component along the thickness or circumference of the pressure relief component, prevent the pressure relief component from being stressed at the actuation mechanism or fragile structure, and improve the structural stability of the pressure relief component.

According to a seventh aspect of this disclosure, an electrolyte injection device is provided, applicable to a battery cell and including:

an electrolyte injection mechanism, configured to inject an electrolytic solution through a first through-hole located on a pressure relief component of the battery cell, where the pressure relief component is disposed on a sidewall of a shell, and the pressure relief component is configured to be actuated when an internal pressure of the battery cell reaches a threshold, so as to release the internal pressure of the battery cell; and a sealing-unsealing mechanism, configured to mount a closing component onto the pressure relief component to close the first through-hole.

In the end cap assembly according to embodiments of this disclosure, the first through-hole configured to inject the electrolytic solution is made on the pressure relief component, and the first through-hole is closed by the closing component. The closing component is detachably disposed on the pressure relief component so as to implement detachment between the closing component and the pressure relief component to enable electrolyte refilling. Through the convenient electrolyte refilling, this disclosure effectively alleviates capacity fading of the battery cell and improves the service life of the battery cell. Moreover, the first through-hole located on the pressure relief component can reduce the area occupied by the components on the end cap body, implement functions of both electrolyte refilling and release of the internal pressure of the battery cell, and vacate more space for battery cell assembling and circuit layout.

BRIEF DESCRIPTION OF DRAWINGS

The drawings described herein are intended to enable a further understanding of this disclosure, and constitute a part of this disclosure. The exemplary embodiments of this disclosure and the description thereof are intended to explain this disclosure but not to constitute any undue limitation on this disclosure.

FIG. 1-B is a schematic structural diagram of a battery according to some embodiments of this disclosure;

FIG. 1-C is a schematic structural diagram of a battery module according to some embodiments of this disclosure;

FIG. 1-D is an exploded view of a battery cell according to some embodiments of this disclosure;

DETAILED DESCRIPTION OF EMBODIMENTS

Figure 1A:
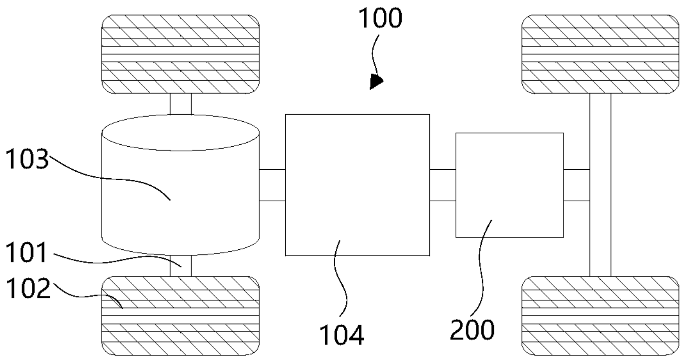
FIG. 1-A is a schematic structural diagram of a battery cell mounted in a vehicle according to some embodiments of this disclosure.

The following describes this disclosure in detail. In the following paragraphs, different aspects of the embodiments are defined in more detail. Unless otherwise expressly specified, the aspects so defined can be combined with any other aspect or aspects. In particular, any feature considered to be preferred or advantageous may be combined with one or more other features considered to be preferred or advantageous.

The terms "first", "second", and the like used in this disclosure are merely intended for ease of description, and are used to distinguish different components with the same name, but do not indicate a chronological order or priority order.

In addition, when one element is referred to as being "on" another element, the element may be directly on the other element, or may be indirectly on the other element with one or more intermediate elements in between. In addition, when one element is referred to as being "connected to" another element, the element may be directly connected to the other element, or may be indirectly connected to the other element with one or more intermediate elements in between. In the description hereinafter, elements are the same as long as they are denoted by the same reference numeral.

"A plurality of" referred to in this disclosure means two or more (including two). Similarly, "a plurality of groups" means two or more groups (including two groups).

In order to clearly describe the directions and positions in the following embodiments, a coordinate system shown in FIG. 1-D, for example, defines each direction of a battery cell 400, where "x" represents a length direction of the battery cell 400, a "y" direction is perpendicular to the x direction in a horizontal plane, and represents a width direction of the battery cell 400, and a "z" direction is perpendicular to a plane formed by the x direction and the y direction, and represents a height direction of the battery cell 400. Based on the direction definitions above, a direction or a positional relationship described by using the terms such as "up", "down", "top", "bottom", "front", "back", "in", or "out" is merely intended for ease of describing this disclosure, but does not indicate or imply that the described device is necessarily located in the specified direction or constructed or operated in the specified direction, and therefore, is not to be understood as a limitation on the protection scope of this disclosure.

There are many problems affecting the service life of a lithium-ion battery cell. Over the years, those skilled in the art have tried solving such problems from many different angles, but desired results have not been achieved yet.

In the invention and creation process of this disclosure, the inventor has found, through numerous tests and verifications, that one of the factors affecting the service life of a battery is that the battery undergoes a plurality of charge-and-discharge cycles during use, and an electrolytic solution inside the battery cell unavoidably incurs irreversible reaction consumption so that an available capacity of the battery cell fades accordingly. Therefore, the inventor finds that, if the electrolytic solution inside the battery cell is supplemented during the use of the battery cell, the capacity fading of the battery cell can be effectively alleviated, and the service life of the battery cell can be improved.

A lithium-ion battery cell includes four main parts: a positive electrode material, a negative electrode material, an electrolytic solution, and a separator. The electrolytic solution is an ionic conductor that conducts between a positive electrode and a negative electrode of the battery cell, and generally includes two parts: electrolyte lithium salt and an organic solvent. High requirements are imposed on structural airtightness of the battery cell in order to prevent the electrolytic solution from seeping and polluting surrounding air and environment during use, or prevent moisture or metal particles from entering the interior of the battery cell to cause a short circuit between the positive electrode and the negative electrode. In the related art known to the inventor, electrolyte injection for the battery cell is usually carried out in a production stage. After completion of the electrolyte injection, an injection hole is usually closed off by laser welding in order to ensure airtightness of the battery cell.

Such a battery cell is difficult to be refilled with the electrolytic solution during use. To refill with the electrolytic solution anyway, a laser weld structure has to be destroyed, and can hardly be re-sealed. In addition, this causes irreversible damage to the structure of the battery cell, and affects the performance of the battery cell in use.

In view of this, this disclosure aims to provide a battery cell with a detachable closing component for electrolyte refilling, so as to facilitate detachment of the closing component for a refill and close off the injection hole reliably after completion of the refill. However, with reference to structural characteristics and performance requirements of a lithium battery cell, many problems still need to be solved to design such a battery cell with a detachable closing component.

Figure 1B:
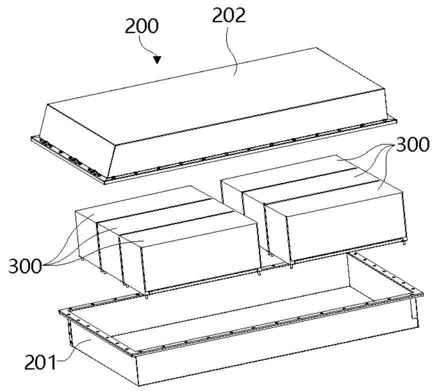
Figure 1C:
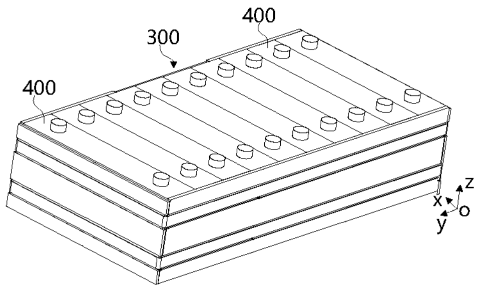

First, as shown in FIG. 1-D, the detachable closing component 3 occupies a larger area on an end cap body 1 than a laser welding manner, and is more prone to protrude from the end cap body 1 by a greater height. In addition, in order to improve safety of the battery cell 400 in use, a pressure relief component 2 needs to be disposed on the end cap body 1. Therefore, the closing component and the pressure relief component 2 need to occupy a relatively large area on the end cap body 1. When a plurality of battery cells 400 are press-fitted to form a battery module 300, a hole or slot needs to be made in a position on a press-fitting tool to avoid interference during the press-fitting, where the position corresponds to the pressure relief component 2 and the closing component 3. Similarly, when a wiring harness fender is disposed on the top of the battery module 300, a hole or slot needs to be made in a position on the wiring harness fender to avoid interference, where the position corresponds to the pressure relief component 2 and the closing component 3. Such a structure results in complicated structures of the wiring harness fender and the assembling tool in the battery module 300.

Secondly, the pressure relief component 2 is designed in such a way that, the larger the area of the pressure relief component 2, the greater the pressure on the pressure relief component 2 on condition that the internal air pressure of the battery cell 400 remains constant. In this way, when the battery cell 400 is thermally runaway, the gas in the battery cell 400 can be quickly expelled to avoid the problem that the battery cell 400 still explodes due to a degassing amount smaller than a gassing amount. Therefore, the area of the pressure relief component 2 needs to be increased as much as practicable to improve safety of the battery cell 400 in use. Restricted by the total area of the end cap body 1, the increased area makes the arrangement space of the components on the end cap body 1 tighter. If the pressure relief component 2 is disposed on the closing component 3 instead so that the entire closing component 3 is detachable to implement electrolyte refilling, the size of the closing component 3 will be increased correspondingly, and the energy density of the battery cell 400 will be reduced.

Therefore, the design of the battery cell 400 still can hardly meet various performance requirements such as a small size, a high energy density, ease of maintenance, reliability, safety, and a long service life.

On the basis of comprehensively considering the foregoing technical problems, in this disclosure, an electrolyte injection member is disposed on the pressure relief component 2 to implement electrolyte refilling and release of internal pressure of the battery cell 400 conveniently.

Specifically, electrolyte injection is a process by which an electrolytic solution is injected into the battery cell in a required amount through a reserved injection hole, and is divided into initial electrolyte injection and electrolyte refilling. Electrolyte refilling may also be referred to as supplementary electrolyte injection, subsequent electrolyte injection, and the like. The electrolyte refilling means a process of supplementing or replacing the electrolytic solution for a battery cell, or adding or supplementing any solid, liquid, or gas into the battery cell. Through the convenient electrolyte refilling, this disclosure effectively alleviates capacity fading of the battery cell and improves the service life of the battery cell 400.

Specifically, the pressure relief component 2 means an element or component that is actuated to relieve an internal pressure or temperature when the internal pressure or temperature of the battery cell 400 reaches a preset threshold. The threshold may vary depending on design requirements. The threshold may depend on the material of one or more of the positive electrode plate, the negative electrode plate, the electrolytic solution, or the separator in the battery cell 400. The pressure relief component 2 may be in the form of an explosion-proof valve, a gas valve, a pressure relief valve, a safety valve, or the like, and may specifically adopt a pressure-sensitive or temperature-sensitive element or structure. To be specific, when the internal pressure or temperature of the battery cell 400 reaches the preset threshold, the pressure relief component 2 is actuated or a fragile structure disposed in the pressure relief component 2 is damaged to form a vent or passageway for relieving the internal pressure or temperature.

The term "actuated" mentioned in this disclosure means that the pressure relief component 2 performs an action or is activated to a given state so that the internal pressure and temperature of the battery cell 400 is relieved. The actions performed by the pressure relief component 2 may include, but are not limited to, rupturing, shattering, tearing, or opening at least a part of the pressure relief component 2, or the like. When the pressure relief component 2 is actuated, high-temperature and high-pressure substances inside the battery cell 400 are expelled as emissions out of the actuated position. In this way, the pressure and temperature of the battery cell 400 are relieved under a circumstance of a controllable pressure or temperature to avoid potential severer accidents.

An electrical device includes a battery cell 400 configured to provide electrical energy for the device. The device may be a mobile phone, a portable device, a notebook computer, an electric power cart, an electric vehicle, a ship, a spacecraft, an electric toy, an electric tool. For example, the spacecraft includes an airplane, a rocket, a space shuttle, a spaceship, and the like. The electric toy includes a fixed or mobile electric toy, such as a game console, an electric car toy, an electric ship toy, an electric airplane toy, and the like. The electric tool includes an electric tool for metal cutting, an electric grinding tool, an electric assembly tool, an electric tool for railways, such as an electric drill, an electric grinder, an electric wrench, an electric screwdriver, an electric hammer, an electric impact drill, a concrete vibrator, and an electric planer.

As shown in FIG. 1-A, the electrical device may be a vehicle 100 such as a new energy vehicle. The new energy vehicle may be a battery electric vehicle, a hybrid electric vehicle, a range-extended electric vehicle, or the like. Alternatively, the electrical device may be an unmanned aerial vehicle, a ship, or the like. Specifically, the vehicle 100 may include an axle 101, wheels 102 connected to the axle 101, a motor 103, a controller 104, and a battery 200. The motor 103 is configured to drive the axle 101 to rotate. The controller 104 is configured to control the motor 103 to operate. The battery 200 includes a plurality of battery cells 400 configured to provide electrical energy for the operation of the motor 103 and other components in the vehicle. The battery cell 400 refillable with an electrolytic solution can reduce the frequency of replacing the battery cell for the device, save cost, and improve reliability and dynamic performance of the device in use.

In order to achieve a higher power of the battery cell 400 to meet practical requirements, as shown in FIG. 1-B, a battery 200 may be disposed in the electrical device. In some embodiments, the battery 200 includes a first housing 201 and a second housing 202 that are snap-fitted to each other. A plurality of battery cells 400 may be disposed in a space enclosed by the first housing 201 and the second housing 202, or the plurality of battery cells 400 may be grouped to form different battery modules 300, or both the battery cells are disposed and the battery modules are formed.

As shown in FIG. 1-C, the battery module 300 includes a plurality of battery cells 400. The plurality of battery cells 400 may be connected in series, parallel, or series-and-parallel pattern to achieve a relatively high capacity or power. For example, as shown in FIG. 1-C, the battery cells 400 may be placed vertically, with a height direction of the battery cell 400 being consistent with a vertical direction; and a plurality of battery cells 400 are disposed side by side along a width direction. Alternatively, the battery cells 400 may be placed flat, with the width direction of the battery cells 400 being consistent with the vertical direction; and the plurality of battery cells 400 may be stacked in at least one layer along the width direction. Each layer includes a plurality of battery cells 400 spaced out along the length direction.

In order for a person skilled in the art to clearly understand the improvements made by this disclosure, an overall structure of the battery cell 400 is described first.

As shown in FIG. 1-D, the battery cell 400 includes a housing 40, an electrode assembly 30, and an end cap assembly 10. The end cap assembly 10 includes a pressure relief component 2. The end cap assembly 10 is connected to the housing 40 to form a shell of the battery cell 400. The electrode assembly 30 is disposed in the housing 40, and the housing 40 is filled with an electrolytic solution. The battery cell 400 may be prismatic, cylindrical, or in other shapes.

One or more electrode assemblies 30 may be disposed depending on actual use requirements. As shown in FIG. 1-D, at least two independently wound electrode assemblies 30 may be disposed in the battery cell instead. A body part of the electrode assembly 30 may be formed by winding or stacking together a first electrode plate, a second electrode plate, and a separator located between the first electrode plate and the second electrode plate. The separator is an insulator located between the first electrode plate and the second electrode plate. The body part includes two opposite end faces. This embodiment is described by using an example in which the first electrode plate is a positive electrode plate and the second electrode plate is a negative electrode plate. A coated region of the positive electrode plate is coated with a positive active material, and a coated region of the negative electrode plate is coated with a negative active material. A plurality of uncoated regions extending from the coated region of the body part are stacked as a tab. The electrode assembly includes two tabs 301, that is, a positive tab and a negative tab. The positive tab is an extension from the coated region of the positive electrode plate, and the negative tab is an extension from the coated region of the negative electrode plate.

The end cap assembly 10 is disposed on the top of the electrode assembly 30. As shown in FIG. 1-D, the end cap assembly 10 includes an end cap body 1 and two terminals 5. The two terminals 5 are a positive terminal and a negative terminal respectively. An adapter 20 is disposed corresponding to each terminal 5. The adapter 20 is located between the end cap body 1 and the electrode assembly 30. For example, a tab 301 of the electrode assembly 30 in FIG. 1-D is located at the top, the positive tab is connected to the positive terminal by one adapter 20, and the negative tab is connected to the negative terminal by another adapter 20. Optionally, the battery cell 400 may include two end cap assemblies 10 disposed at two ends of the housing 40 respectively. A terminal 5 is disposed on each end cap assembly 10.

After the overall structure and application of the battery cell 400 are described, the improvements made by this disclosure will be described in detail below. First, an example is described in which both a closing component 3 and a pressure relief component 2 are disposed in an end cap assembly 10. A plurality of embodiments of this disclosure are described based on this structure.

Figure 2:
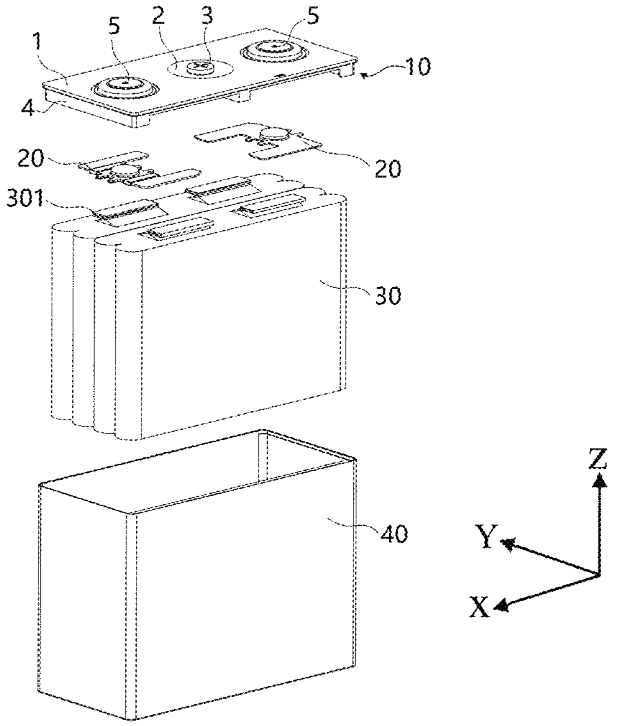
FIG. 2 is a schematic structural diagram of an end cap assembly in a battery cell according to a first embodiment of this disclosure.
Figure 2:
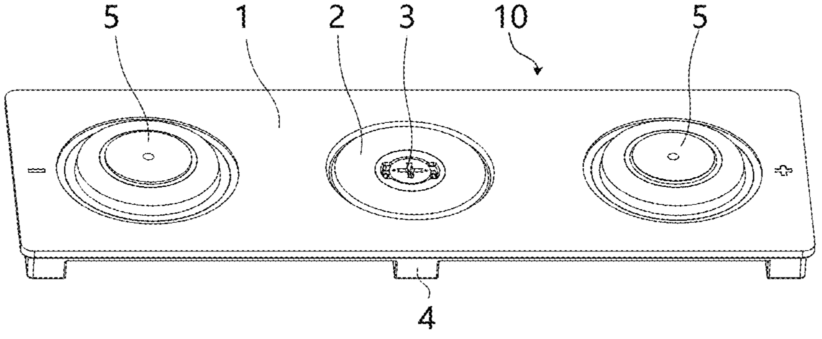

In some embodiments, as shown in FIG. 2, an end cap assembly 10 applicable to a battery cell 400 includes: an end cap body 1, a pressure relief component 2, and a closing component 3.

The end cap body 1 may be in a rectangular plate-like structure. The pressure relief component 2 is connected to the end cap body 1. The pressure relief component 2 is configured to be actuated when an internal pressure of the battery cell 400 reaches a threshold, so as to release the internal pressure of the battery cell 400. The pressure relief component 2 may be disposed at any position between two terminals 5, for example, between the two terminals 5 and at a middle position of the end cap body 1 along a length direction. A first through-hole 21 configured to inject an electrolytic solution is disposed on the pressure relief component 2. The first through-hole 21 may be a circular, elliptical, or polygonal hole or a hole in other shapes. Benchmarked against the battery cell 400, the first through-hole 21 may be disposed along a height direction of the battery cell 400, that is, along a thickness direction of the end cap body 1; or may be disposed obliquely. A sidewall of the first through-hole 21 may be located within an outer contour of the pressure relief component 2.

The closing component 3 is detachably disposed on the pressure relief component 2. The closing component 3 is configured to close the first through-hole 21 when being mounted on the pressure relief component 2, and expose the first through-hole 21 when detaching from the pressure relief component 2 so that an electrolytic solution can be injected in this state.

In this disclosure, electrolyte refilling can be implemented by detaching the closing component 3 from a pressure relief body 25. Through the convenient electrolyte refilling, this disclosure effectively alleviates capacity fading of the battery cell 400 and improves the service life of the battery cell 400. Further, the first through-hole 21 communicates the interior of the housing 40 with external atmosphere after the closing component 3 is detached, thereby expelling the gas out of the housing 40 or air bubbles between electrode plates. By expelling the air bubbles between the electrode plates, a clearance between the electrode plates is shortened, thereby improving cycle performance of the battery cell 400, and further, improving the service life of the battery cell 400. By expelling the gas out of the housing of the battery cell 400, this disclosure can also release pressure in the housing 40, thereby reducing a continuous force exerted by the gas in the housing 40 on the pressure relief component 2, reducing risks of shortening the battery life due to electrolyte leakage out of or moisture entry into the battery cell 400 in a case of a creep or rupture of the pressure relief component 2, and in turn, improving the service life of the battery cell.

This disclosure forms a detachable structure between the closing component 3 and the pressure relief component 2, and prevents the electrolyte injection structure from being damaged during opening of the opening component 3. Further, the first through-hole 21 can be reliably closed after completion of electrolyte refilling, thereby ensuring reliability of the battery cell in use after the electrolyte refilling. Therefore, the appearance of the battery cell 400 remains the same as before the electrolyte refilling, without affecting the use of the battery cell after the electrolyte refilling. Further, because the first through-hole 21 is closed by directly using the detachable closing component 3, the sealing of the first through-hole 21 is implemented without laser welding, thereby saving a step of cleaning the first through-hole 21 before the laser welding, and improving the production efficiency of the battery cell.

In this disclosure, the first through-hole 21 configured to inject an electrolytic solution is disposed on the pressure relief component 2, and the first through-hole 21 is closed by the closing component 3. This is equivalent to integrating the closing component 3 with the pressure relief component 2, thereby not only reducing the area occupied by the closing component 3 and the pressure relief component 2 on the end cap body 1, but also reducing the number of avoidance holes or slots required on a press-fitting tool when a plurality of battery cells 400 are press-fitted to form a battery module 300. Similarly, a wiring harness fender is disposed on the top of the plurality of battery cells 400, thereby reducing the number of avoidance holes or slots required on the wiring harness fender. Moreover, the number of avoidance holes or slots required on the tooling and the wiring harness fender can be halved. In this way, the end cap assembly 10 according to this disclosure can greatly reduce the structural complexity of the wiring harness fender and the assembling tool in the battery module 300.

Secondly, during designing of the pressure relief component 2, in order to improve the degassing safety of the battery cell 400, the area of the pressure relief component 2 needs to be increased as much as practicable during designing of the pressure relief component 2. In the end cap assembly 10 according to this disclosure, the closing component 3 is integrated with the pressure relief component 2, thereby reducing the space occupied by the closing component 3 and the pressure relief component 2 on the end cap body 1 of the end cap assembly 10. Therefore, such an arrangement helps increase the area of the pressure relief component 2 on condition that the area of the end cap body 1 remains constant, and helps increase the pressure on the pressure relief component 2 on condition that the internal air pressure of the battery cell 400 remains constant. In this way, when the battery cell 400 is thermally runaway, the gas in the battery cell 400 can be quickly expelled to avoid the problem that the battery cell 400 explodes due to a degassing amount smaller than a gassing amount, thereby improving safety of the battery cell 400 in use.

In the end cap assembly 10 according to this disclosure, the first through-hole 21 is made on the pressure relief component 2 instead of removing the entire pressure relief component 2 for a purpose of electrolyte injection. In this way, the area of the first through-hole 21 is smaller than that of the pressure relief component 2, thereby reducing the size of the closing component 3 on the basis of increasing the area of the pressure relief component 2, and in turn, increasing the energy density of the battery cell 400.

Figure 3:
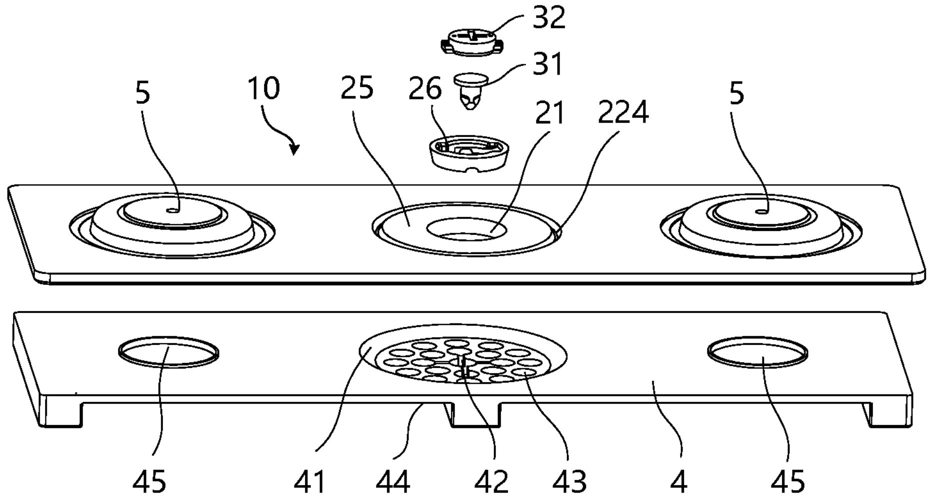
FIG. 3 is an exploded view of an end cap assembly according to a first embodiment of this disclosure.
Figure 7:
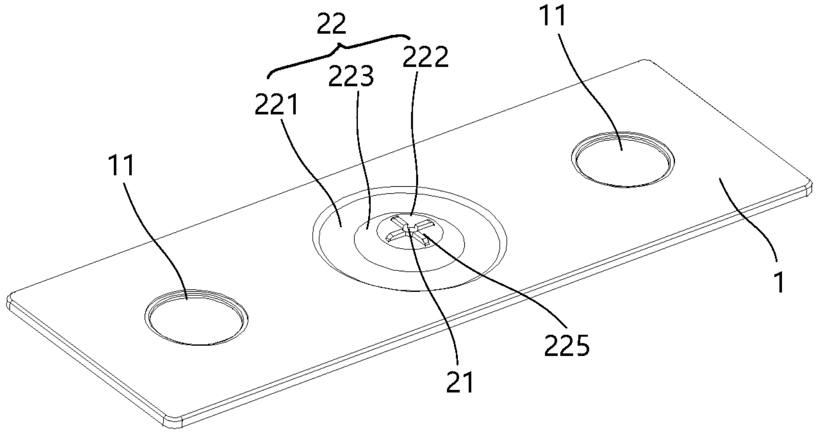
FIG. 7 is a schematic structural diagram of a side that is of an end cap body and that is oriented toward an insulation piece according to a first embodiment.
Figure 8:
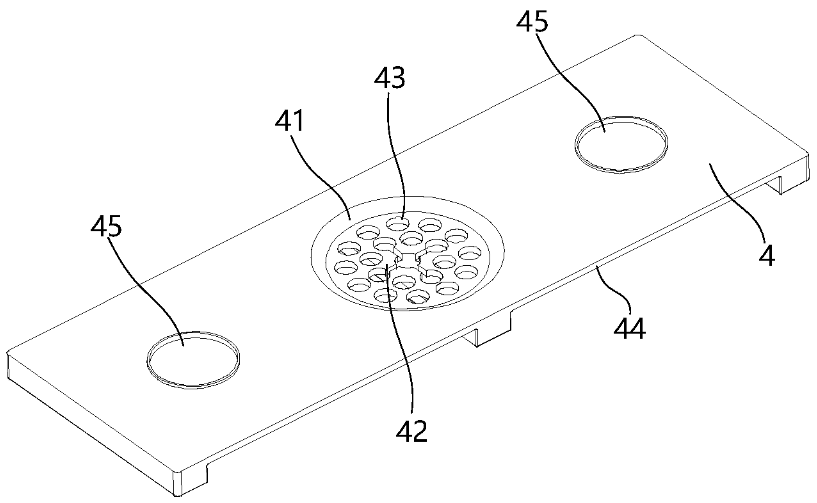
FIG. 8 is a schematic structural diagram of a side that is of an insulation piece and that is oriented toward an end cap body according to a first embodiment.
Figure 9:
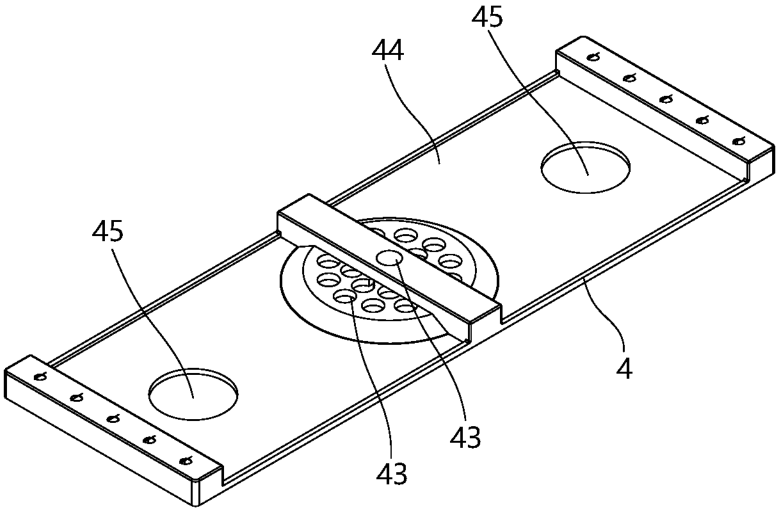
FIG. 9 is a schematic structural diagram of a side that is of an insulation piece and that is oriented toward an interior of a battery cell according to a first embodiment.

In some embodiments, as shown in FIG. 2 and FIG. 3, the end cap assembly 10 according to this disclosure further includes an insulation piece 4. For example, the insulation piece 4 is an insulation plate made of an insulation material such as plastic. The insulation piece 4 may be a rectangular plate-like structure that fits the shape and size of the end cap body 1. As shown in FIG. 7, two mounting holes 11 are made on the end cap body 1. As shown in FIG. 8, two communicating holes 45 are made on the insulation piece 4. A terminal 5 is connected to an adapter 20 on a tab 301 through a communicating hole 45. A positive tab of the electrode assembly 30 is connected to a positive terminal by the adapter 20 through the communicating hole 45. A negative tab of the electrode assembly 30 is connected to a negative terminal by the adapter 20 through the communicating hole 45. A groove 44 is made on a side that is of the insulation piece 4 and that is away from the end cap body 1. For example, two grooves 44 may be spaced out along a length direction of the insulation piece 4 to form three ribs on the side that is of the insulation piece 4 and that is away from the end cap body 1, so as to hold down the electrode assembly 30. For example, when applied to a vehicle 100, such arrangement can prevent the electrode assembly 30 from pulling the tabs due to vibration during movement of the vehicle, where the pulling is prone to result in breakage at an electrical joint.

Figure 4:
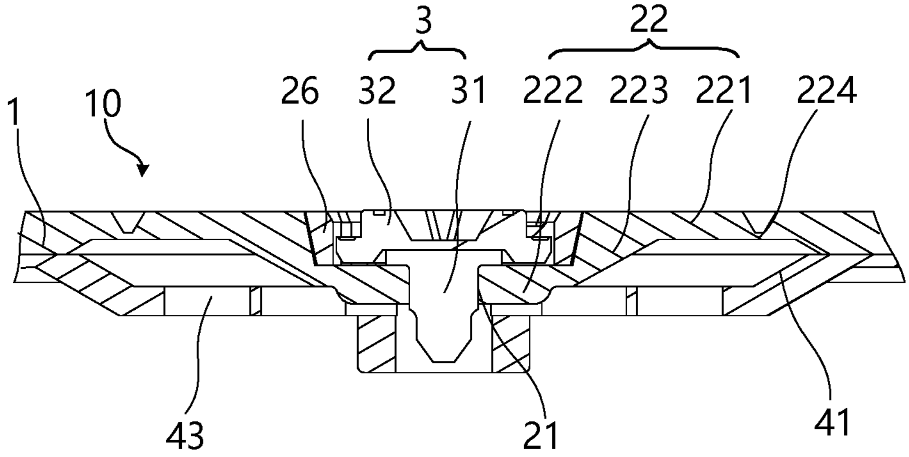
FIG. 4 and FIG. 5 are partial sectional views of an end cap assembly according to a first embodiment.

As shown in FIG. 4, the insulation piece 4 is disposed on a side that is of the end cap body 1 and that is close to the interior of the battery cell 400, and abuts on the pressure relief component 2 to support the pressure relief component 2. The insulation piece 4 abuts on an opposite surface of the end cap body 1. For example, the entire pressure relief component 2 may abut on the insulation piece 4, so as to provide a stable and reliable supporting force for the pressure relief component 2; or, a partial region of the pressure relief component 2 abuts on the insulation piece 4. The abutting may be a plane-to-plane contact, a plane-to-curve contact, or a concave-convex-fitted structure, or the like.

During detachment and attachment of the closing component 3, an external force is inevitably exerted on the pressure relief component 2. For example, a downward pressure, an upward pulling force, or a circumferential rotational force is exerted on the pressure relief component 2. Generally, an actuation mechanism or a fragile structure is disposed on the pressure relief component 2, and is actuated when the internal pressure of the battery cell 400 reaches a preset threshold, so as to release the internal pressure of the battery cell 400. The external force so exerted on the pressure relief component 2 may cause deformation or damage to the actuation mechanism or fragile structure, and affect normal pressure relief.

The end cap assembly 10 according to this disclosure abuts on the pressure relief component 2 through the insulation piece 4, so as to support the pressure relief component 2 and equalize the external force received by the pressure relief component 2. This prevents the pressure relief component 2 from being damaged during detachment and attachment of the closing component 3, improves reliability of the battery cell 400 during electrolyte refilling, and increases the service life of the battery cell 400. Moreover, when the end cap assembly 10 is subjected to the external force, the support by the insulation piece 4 can prevent the pressure relief component 2 from being deformed or damaged, so as to ensure fulfillment of the expected pressure relief effect and improve safety of the battery cell 400 in use. For example, when the battery cell 400 is mounted in a vehicle 100, the vehicle 100 is subjected to vibration or external impact during movement, and the support by the insulation piece 4 can prevent the pressure relief component 2 from deforming under the action of vibration or impact.

In some embodiments, as shown in FIG. 4, a snap-fit structure is disposed between the pressure relief component 2 and the insulation piece 4. The snap-fit structure is configured to limit torsional deformation of the pressure relief component 2 with respect to the end cap body 1 along a circumference of the pressure relief component 2.

As shown in FIG. 4, the closing component 3 includes a sealing element 31 and a cover body 32. The sealing element 31 is configured to seal the first through-hole 21. The cover body 32 is configured to cover at least a part of the sealing element 31, and is detachable by rotating. For the cover body 32 that is detachable by rotating, in a process of electrolyte refilling implemented by unscrewing the cover body 32, a circumferential force is transmitted to the pressure relief component 2 through the cover body 32. In the end cap assembly 10 according to this disclosure, the snap-fit structure is disposed between the insulation piece 4 and the pressure relief component 2 to equalize the circumferential external force received by the pressure relief component 2. This prevents the pressure relief component 2 from being damaged during detachment and attachment of the cover body 32, improves reliability of the battery cell 400 during electrolyte refilling, and increases the service life of the battery cell 400.

Figure 5:
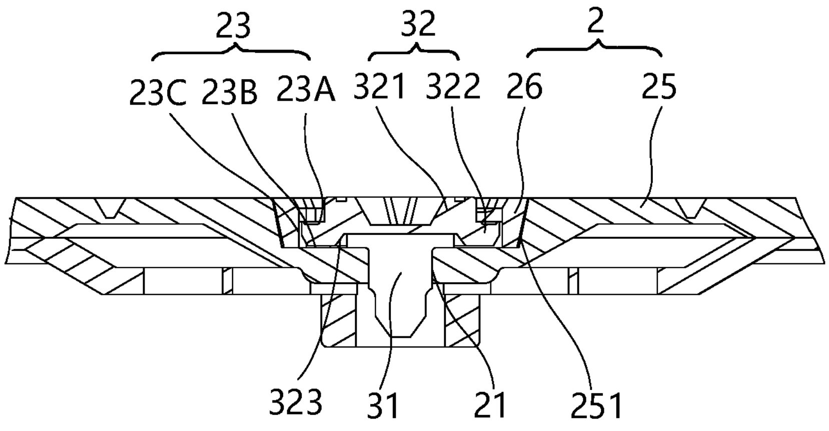

In some embodiments, as shown in FIG. 5, FIG. 7, and FIG. 8, the snap-fit structure includes a first protruding portion 225 and a recessed portion 42 that fit each other. The first protruding portion 225 may be disposed on a surface that is of the pressure relief component 2 and that is oriented toward the insulation piece 4. The first protruding portion 225 may be formed by machining or stamping. The recessed portion 42 is disposed on a surface that is of the insulation piece 4 and that is oriented toward the pressure relief component 2.

For example, with respect to the shape, the first protruding portion 225 and the recessed portion 42 may be dot-like, strip-like, block-like structures. With respect to the position, the first protruding portion 225 and the recessed portion 42 may be disposed on a plane on which the pressure relief component 2 abuts on the insulation piece 4. Alternatively, a circumferential fitting structure may be disposed between the pressure relief component 2 and the insulation piece 4, and the snap-fit structure is disposed on the circumferential fitting structure. With respect to the number of the snap-fit structures, one or more snap-fit structures may be disposed. The position of the first protruding portion 225 is interchangeable with the position the recessed portion 42. The first protruding portion 225 is disposed on the insulation piece 4, and the recessed portion 42 is disposed on the pressure relief component 2. Any structure that can limit the torsional deformation of the pressure relief component 2 along the circumference falls within the protection scope of this disclosure.

In this embodiment, the snap-fit structure with the first protruding portion 225 fitted with the recessed portion 42 enables the insulation piece 4 to exert a reliable circumferential restraint effect on the pressure relief component 2, and prevents torsional deformation of the pressure relief component 2 along the circumference of the pressure relief component 2 with respect to the end cap body 1, so as to reduce the force received at the actuation mechanism or fragile structure of the pressure relief component 2, and improve structural stability of the pressure relief component 2. Moreover, because the pressure relief component 2 is of lesser thickness and lesser strength, the first protruding portion 225 disposed on the pressure relief component 2 can increase structural strength to ensure normal pressure relief performance.

Optionally, the first protruding portion 225 may be in transition fit or interference fit with the recessed portion 42 to ensure a circumferential restraint effect exerted by the insulation piece 4 on the pressure relief component 2.

In some embodiments, a plurality of snap-fit structures are disposed. The plurality of snap-fit structures are evenly distributed circumferentially around an axis of the pressure relief component 2.

As shown in FIG. 7 and FIG. 8, a plurality of first protruding portions 225 are radially disposed around the axis of the pressure relief component 2 on a surface that is of the pressure relief component 2 and that is oriented toward the insulation piece 4; and a plurality of recessed portions 42 are radially disposed around the axis of the pressure relief component 2 on a surface that is of the insulation piece 4 and that is oriented toward the pressure relief component 2. The plurality of first protruding portions 225 are in one-to-one correspondence with the plurality of recessed portions 42. For example, the plurality of first protruding portions 225 form a cross boss, and the plurality of recessed portions 42 form a cross recess.

Alternatively, on the basis of FIG. 7 and FIG. 8, the first protruding portion 225 and the recessed portion 42 may be disposed at an angle such as 90° to a radial direction of the pressure relief component 2.

In this embodiment, a plurality of snap-fit structures are evenly distributed circumferentially around the axis of the pressure relief component 2. In this way, a circumferential supporting force exerted by the insulation piece 4 on the pressure relief component 2 is more equalized during electrolyte refilling after the cover body 32 is unscrewed, and the circumferential external force received by the pressure relief component 2 is equalized along the entire circumferential direction. This improves the effect of protecting the pressure relief component 2 during detachment and attachment of the cover body 32, prevents the pressure relief component 2 from being damaged during detachment and attachment of the cover body 32, improves reliability of the battery cell 400 during electrolyte refilling, and increases the service life of the battery cell 400.

Figure 13:
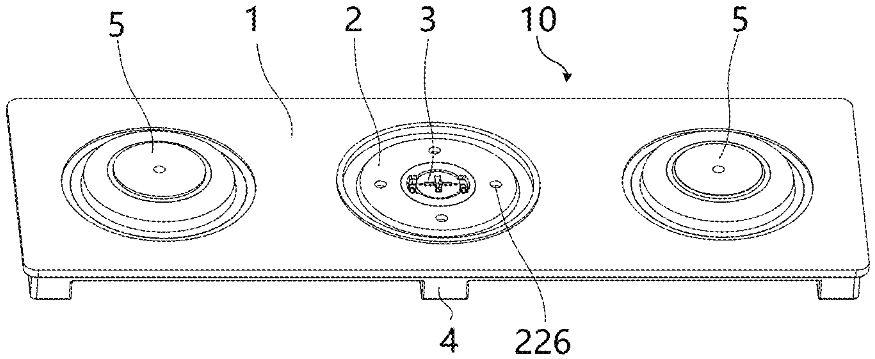
FIG. 13 is a schematic structural diagram of an end cap assembly in a battery cell according to a second embodiment of this disclosure.

In some embodiments, as shown in FIG. 13, a positioning hole 226 is made on an outer surface of the pressure relief component 2. The positioning hole 226 is configured to assist in positioning the pressure relief component 2 when the closing component 3 closes the first through-hole 21. For example, a plurality of positioning holes 226, such as two, three, or four positioning holes, are circumferentially spaced out on the outer surface of the pressure relief component 2. During assembling of the end cap assembly 10 or electrolyte refilling, tooling may be inserted into the positioning holes 226 to provide a clamping force for the pressure relief component 2, so as to reduce the external force received by the pressure relief component 2 along the thickness or circumference of the pressure relief component, prevent the pressure relief component 2 from being stressed at the actuation mechanism or fragile structure, and improve the structural stability of the pressure relief component 2.

In some embodiments, as shown in FIG. 2, the first through-hole 21 is located at a center position of the pressure relief component 2.

This embodiment equalizes a radial width of the pressure relief component 2 at a part outside the first through-hole 21, so as to equalize strength of the pressure relief component 2 along the entire circumferential direction, prevent the pressure relief component from being actuated when the internal pressure of the battery cell 400 does not reach the threshold, and improve safety of the battery cell 400 in use. Moreover, this prevents an unequal force from being exerted on the entire circumferential direction of the pressure relief component 2 during detachment and attachment of the closing component 3, and improves structural stability of the pressure relief component 2 during detachment and attachment of the closing component 3. Optionally, the first through-hole 21 may instead be located in a region on the pressure relief component 2 other than the center position.

In some embodiments, as shown in FIG. 3, the pressure relief component 2 includes an explosion-proof valve 22. The first through-hole 21 is disposed on the explosion-proof valve 22.

For example, one explosion-proof valve 22 is disposed, and the first through-hole 21 is made at a center position of the explosion-proof valve 22. This structure reduces the processing difficulty of the explosion-proof valve 22, helps increase the area of the explosion-proof valve 22, and increases the pressure on the pressure relief component 2 on condition that the internal air pressure of the battery cell 400 remains constant. In this way, in a case that the battery cell 400 is thermally runaway, gas in the battery cell 400 can be quickly expelled to avoid the problem that the battery cell 400 explodes due to a degassing amount smaller than a gassing amount, thereby improving safety of the battery cell 400 in use. Alternatively, a plurality of explosion-proof valves 22 are disposed, and the first through-hole 21 is made on one of the explosion-proof valves 22, or the first through-hole 21 is made on at least a part of the explosion-proof valves 22.

In some embodiments, as shown in FIG. 3 and FIG. 4, the explosion-proof valve 22 includes a first portion 221 and a second portion 222.

The first portion 221 takes the shape of an annular structure. The first portion 221 includes a fragile region 224. The fragile region 224 is located outside the first through-hole 21, and extends along a circumference of the explosion-proof valve 22. The fragile region 224 is configured to be actuated to break when the internal pressure of the battery cell 400 reaches the threshold, so as to release the internal pressure of the battery cell 400. An outer edge of the first portion 221 may be located at an outer rim of the fragile region 224, or may be located at a position that is offset outward from the outer rim of the fragile region 224 by a given distance.

For example, the fragile region 224 extends along the entire circumferential direction of the explosion-proof valve 22; or extends along a part of the circumference of the explosion-proof valve 22. The fragile region 224 may extend continuously (for example, along ¾ of the circumference) or a plurality of sections of the fragile region may be disposed at intervals. In this way, after the fragile region 224 is actuated to break, the explosion-proof valve 22 is still connected to the end cap body 1, and is prevented from flying into other components and affecting the normal operation of the devices such as the vehicle 100, thereby improving safety of the devices in use.

As shown in FIG. 4, the fragile region 224 is a thinned portion. A nick is disposed on an outer surface or inner surface of the explosion-proof valve 22 to reduce a local thickness of the explosion-proof valve 22 and form a thinned portion. A cross section of the nick may be triangular, trapezoidal, or the like. To facilitate disposition of the fragile region 224, a side that is of the first portion 221 and that is away from the nick may be recessed inward. For such a structure, the explosion-proof valve 22 is defined as a valve plate structure formed after the nick and the recessed structure are disposed.

Optionally, a melting point of the fragile region 224 is lower than a melting point of other regions on the explosion-proof valve 22.

As shown in FIG. 4, the second portion 222 is disposed inside the first portion 221 along a radius of the explosion-proof valve 22. A thickness of the second portion 222 is greater than a thickness of the first portion 221. The first through-hole 21 is located at the center position of the explosion-proof valve 22. Correspondingly, the second portion 222 is also located at the center position of the explosion-proof valve 22, and the first through-hole 21 is made in the second portion 222.

The explosion-proof valve 22 according to this embodiment adopts a thickness-varying structure, thereby making it convenient to not only dispose the fragile region 224 on the explosion-proof valve 22, but also partially thicken a region in which the first through-hole 21 is located, so as to facilitate design of a connection structure between the closing component 3 and the explosion-proof valve 22 and increase the connection strength between the closing component 3 and the explosion-proof valve 22, and in turn, improve reliability of design of integrating the closing component 3 with the pressure relief component 2.

In some embodiments, as shown in FIG. 4, the explosion-proof valve 22 further includes a transition portion 223. The transition portion 223 takes the shape of an annular structure, and is connected between the first portion 221 and the second portion 222 along the radius of the explosion-proof valve 22. For example, the thickness of the transition portion 223 varies gradually along the radial direction. Specifically, an outer surface of the transition portion 223 may be flush with an outer surface of the first portion 221, and an inner surface of the transition portion forms a beveled face; or the inner surface of the transition portion 223 may be a terraced or curved transition.

In the explosion-proof valve 22 according to this embodiment, the transition portion 223 is disposed between the first portion 221 and the second portion 222, thereby implementing smooth transition between the first portion 221 and the second portion 222, reducing the probability of stress concentration in the thickness-varying region, and in turn, improving the overall strength of the explosion-proof valve 22, and reducing the probability of deforming or damaging the explosion-proof valve 22 during detachment and attachment of the closing component 3. Optionally, the first portion 221 may be directly connected to the second portion 222 instead.

In some embodiments, as shown in FIG. 8, the end cap assembly 10 further includes an insulation piece 4. The insulation piece 4 is disposed on a side that is of the end cap body 1 and that is close to an interior of the battery cell 400. A second through-hole 43 is made on the insulation piece 4, and the second through-hole 43 is configured to implement communication between the interior of the battery cell 400 and the fragile region 224. One or more second through-holes 43 may be made.

In this embodiment, the second through-hole 43 is made on the insulation piece 4 to form a passageway available for the gas inside the battery cell 400 to reach the fragile region 224. In this way, when the internal pressure of the battery cell 400 exceeds the threshold, the internal pressure or heat can be smoothly released through the explosion-proof valve 22, thereby improving safety of battery cell 400 in use.

In some embodiments, as shown in FIG. 4, a first groove 41 is made on a surface that is of the insulation piece 4 and that is oriented toward the end cap body 1. The second portion 222 extends into the first groove 41.

In order to increase the strength of the explosion-proof valve 22, the second portion 222 is thickened. In this embodiment, the second portion 222 extends into the first groove 41, thereby maximally avoiding increase of the overall thickness of the end cap assembly 10 on the basis of increasing the strength of the explosion-proof valve 22, thereby increasing the energy density without changing the size of the battery cell 400.

On this basis, as shown in FIG. 4, the second portion 222 may abut on a bottom face of the first groove 41 to provide a supporting force for the explosion-proof valve 22, stabilize the structure of the explosion-proof valve 22, and prevent the explosion-proof valve 22 from deforming during detachment and attachment of the closing component 3. Correspondingly, the second through-hole 43 is made on the bottom face of the first groove 41 or on a sidewall of the first groove 41. As shown in FIG. 8, the sidewall of the first groove 41 is beveled, so as to reduce stress concentration and implement communication between the interior of the battery cell 400 and the fragile region 224 while reducing a radial dimension of the first groove 41.

Figure 17:
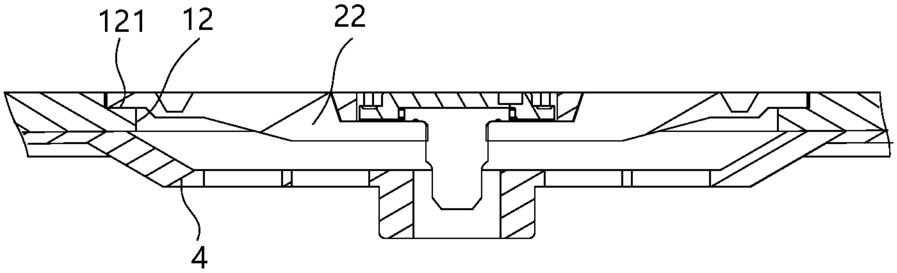
FIG. 17 is a schematic structural diagram of some variations of connection between a pressure relief component and an end cap body according to a second embodiment.

Optionally, as shown in FIG. 17, the second portion 222 extends into the first groove 41, and the second portion 222 is at a preset distance from the bottom face of the first groove 41.

Figure 18:
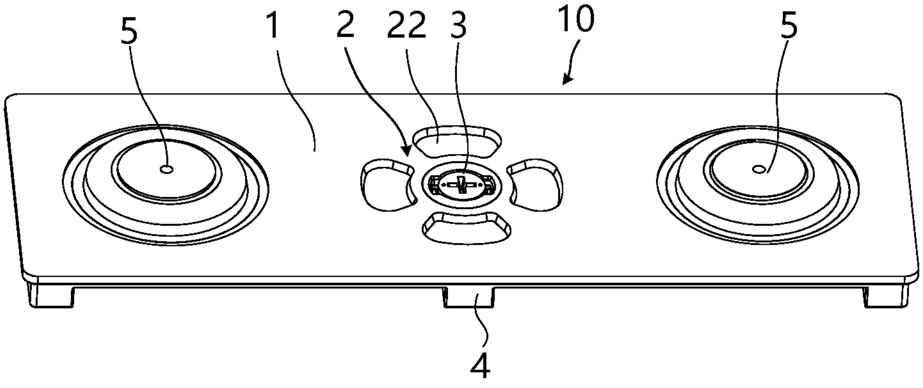
FIG. 18 is a schematic structural diagram of an end cap assembly in a battery cell according to a third embodiment of this disclosure.

In some embodiments, as shown in FIG. 18, the pressure relief component 2 includes a plurality of explosion-proof valves 22. The plurality of explosion-proof valves 22 are disposed independently at intervals along the periphery of the first through-hole 21. The pressure relief component 2 is defined as a part enclosed by the outer rims of a plurality of explosion-proof valves 22. For example, a plurality of explosion-proof valves 22 are distributed at equal intervals, so that the pressure relief component 2 is equally stressed at all positions on the circumference. The number of explosion-proof valves 22 may be two, three, four, or more, and each explosion-proof valve 22 may be an arc-shaped groove.

In this embodiment, the first through-hole 21 and the explosion-proof valve 22 are disposed independently. Therefore, the thickness of a joint between the first through-hole 21 and the explosion-proof valve 22 is consistent with the thickness of the end cap body 1, thereby ensuring sufficient structural strength of the joint. In addition, the fragile region 224 of the explosion-proof valve 22 is independent of the electrolyte injection mechanism, so that the external force generated during detachment and attachment of the closing component 3 is prevented from directly acting on the explosion-proof valve 22 during the assembling of the end cap assembly 10 or the electrolyte refilling, and the fragile region 224 of the explosion-proof valve 22 is prevented from being deformed or damaged.

Figure 19:
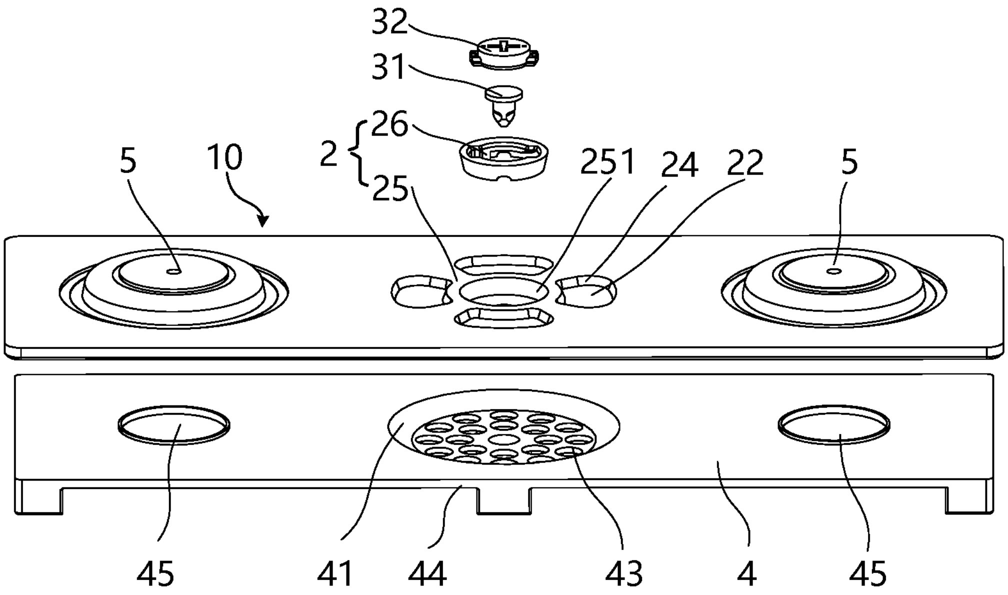
FIG. 19 is an exploded view of an end cap assembly according to a third embodiment of this disclosure.
Figure 20:
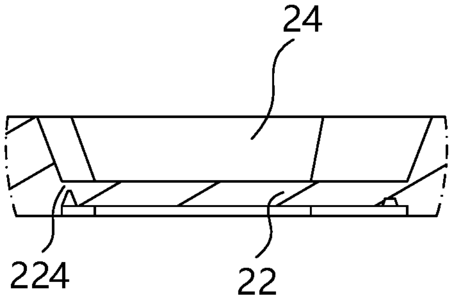
FIG. 20 is a sectional view of a single explosion-proof valve according to a third embodiment.

In some embodiments, as shown in FIG. 18 and FIG. 19, a plurality of second grooves 24 are made on the pressure relief component 2. A part of the pressure relief component 2 in the thickness direction, which is other than the second groove 24, forms the explosion-proof valve 22. The second groove 24 may be disposed on a surface that is of the pressure relief component 2 and that is away from the interior of the battery cell 400. As shown in FIG. 20, the explosion-proof valve 22 includes a fragile region 224. The fragile region 224 is configured to be actuated when the internal pressure of the battery cell 400 reaches the threshold, so as to release the internal pressure of the battery cell 400. The fragile region 224 may be a thinned portion or a lower-melting-point region. For example, the fragile region 224 is disposed on each explosion-proof valve 22. A nick extending along at least a part of the circumference of the explosion-proof valve 22 may be made on the bottom face of the second groove 24, or a nick may be made in a region located on an inner side of the pressure relief component 2 and corresponding to the second groove 24, to form the fragile region 224.

In this embodiment, the plurality of second grooves 24 are made to form a plurality of independent explosion-proof valves 22 to facilitate arrangement of the fragile region 224. In addition, the fragile region 224 of the explosion-proof valves 22 is independent of the closing component 3, so that the external force generated during detachment and attachment of the closing component 3 is prevented from directly acting on the explosion-proof valves 22 during the assembling of the end cap assembly 10 or the electrolyte refilling, and the fragile region 224 of the explosion-proof valves 22 is prevented from being deformed or damaged.

In some embodiments, as shown in FIG. 2 to FIG. 7, the pressure relief component 2 is integrated with the end cap body 1. A thinned portion of the pressure relief component 2, which serves as the fragile region 224, may be formed directly by stamping locally.

In the structure provided in this embodiment, the pressure relief component 2 is integrated with the end cap body 1, thereby increasing the connection strength between the pressure relief component 2 and the end cap body 1, and saving a step of fixing the pressure relief component 2 onto the end cap body 1. This reduces the manufacturing difficulty and cost of the end cap assembly 10, and prevents an actuating pressure on the explosion-proof valve 22 from being affected by a welding stress generated when the fixing manner is welding or the like.

Figure 14:
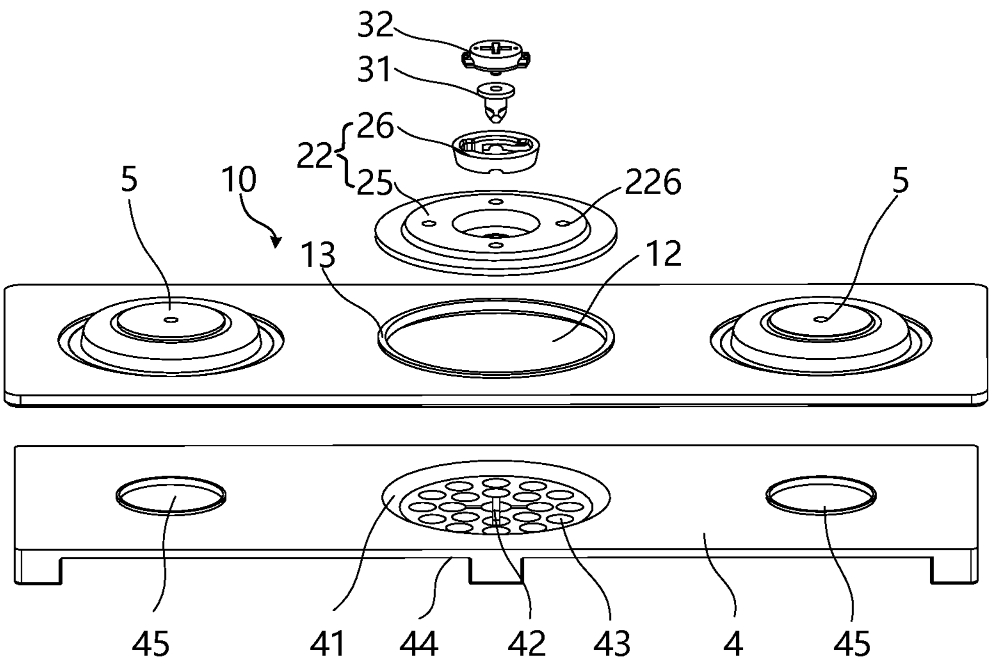
FIG. 14 is an exploded view of an end cap assembly according to a second embodiment of this disclosure.

In some embodiments, as shown in FIG. 13 and FIG. 14, a third through-hole 12 is made on the end cap body 1. The pressure relief component 2 is fixed inside the third through-hole 12. For example, the pressure relief component 2 may be fixed inside the third through-hole 12 by welding. In order to improve the connection strength between the pressure relief component 2 and the end cap body 1, an annular boss 13 may be disposed on the periphery of the third through-hole 12 to increase the height of the third through-hole 12.

In this embodiment, an independent pressure relief component 2 is fixed to the end cap body 1, thereby reducing the manufacturing difficulty. The pressure relief component 2 can be formed by stamping in advance and then fixed to the end cap body 1. In this way, poorly stamped parts in the pressure relief component 2 can be eliminated, thereby reducing the reject rate of assembled finished products and reducing the production cost of products.

Figure 15:
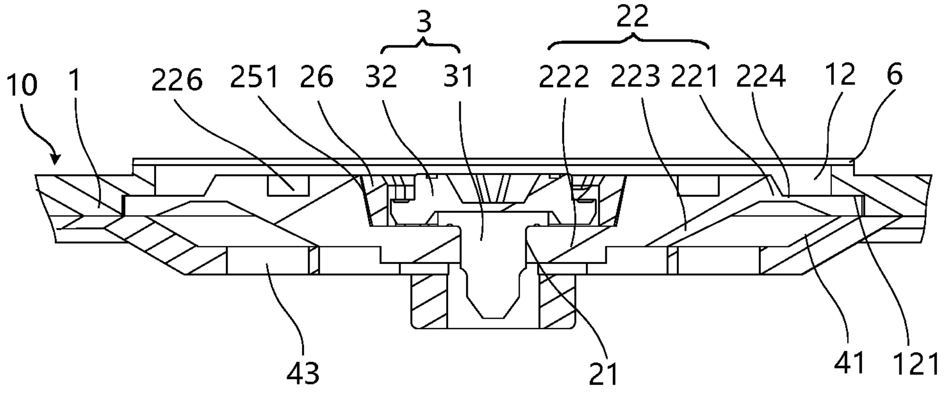
FIG. 15 is a partial sectional view of an end cap assembly according to a second embodiment.
Figure 16A:
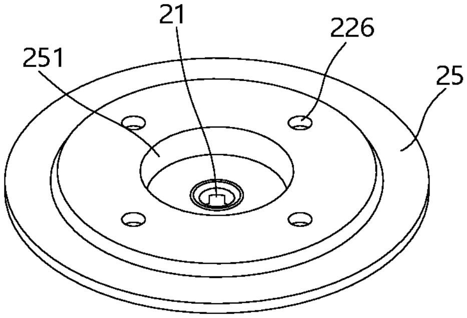
FIG. 16A and FIG. 16B are schematic structural diagrams of a front side and a back side, respectively, of a pressure relief component according to a second embodiment.
Figure 16B:
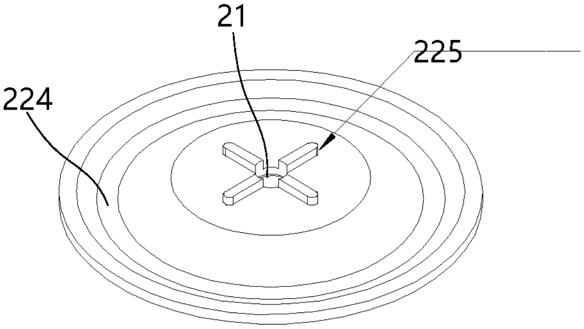

In some embodiments, as shown in FIG. 15, a locking base 121 is disposed on a hole wall of the third through-hole 12. The locking base 121 is disposed on a side that is of the end cap body 1 and that is close to an interior of the battery cell 400. The pressure relief component 2 abuts against the locking base 121 to connect to the end cap body 1.

The air pressure inside the battery cell 400 acts from inside to outside. Therefore, in this embodiment, the pressure relief component 2 abuts against the locking base 121 from inside. The locking base 121 may serve as a main body for bearing the air pressure, thereby reducing the force on the joint between the pressure relief component 2 and the end cap body 1, reducing the probability of seal failure caused by a creep of the joint between the pressure relief component 2 and the end cap body 1 after long-term use of the battery cell 400, and increasing the service life of the battery cell 400. Optionally, as shown in FIG. 17, the locking base 121 is disposed on a side that is of the end cap body 1 and that is close to the interior of the battery cell 400. The pressure relief component 2 abuts against the locking base 121 to connect to the end cap body 1. In this structure, the pressure relief component 2 is disposed close to the outer side of the end cap assembly 10, thereby increasing the energy density of the battery cell 400.

In some embodiments, as shown in FIG. 15, the end cap assembly 10 further includes a protection sheet 6. The protection sheet 6 is affixed to a surface that is of the pressure relief component 2 and that is away from the interior of the battery cell 400. This embodiment prevents external impurities or moisture from entering the battery cell 400 through the closing component 3, and improves air-tightness of the end cap assembly 10.

In some embodiments, as shown in FIG. 2 to FIG. 5, FIG. 13 to FIG. 15, and FIG. 18 to FIG. 19, the closing component 3 includes a sealing element 31 and a cover body 32. The sealing element 31 is configured to seal the first through-hole 21. The cover body 32 is configured to cover at least a part of the sealing element 31, and the cover body 32 is configured to be detachable by rotating. For example, the cover body is rotatable in a plane perpendicular to the height direction, and a rotation axis may be an axis of the first through-hole 21. The sealing element 31 and the cover body 32 may be an integrated structure, or may be discrete structures.

The cover body 32 may hold down the sealing element 31 so that the sealing element 31 is deformed to improve the sealing effect, or may just contact the sealing element 31 to limit the degree of freedom of the sealing element along the height direction. In a case that the sealing element 31 is in tight fit with the first through-hole 21 and capable of independently closing the first through-hole 21, the cover body 32 may be spaced apart from the sealing element 31 in the height direction. The cover body 32 may fully cover the sealing element 31 to exert a pressure on the sealing element 31 to limit the position or prevent external impurities from entering the battery. In a case that the sealing element 31 is in tight fit with the first through-hole 21 and capable of independently closing the first through-hole 21, the cover body 32 may partly cover the sealing element 31.

In this embodiment, the first through-hole 21 is opened and closed by rotating the cover body 32, so as to form a detachable structure between the cover body 32 and the pressure relief component 2, and prevent the electrolyte injection structure from being damaged during opening of the cover body 32. Further, the first through-hole 21 can be reliably closed after completion of electrolyte refilling, thereby ensuring reliability of the battery cell 400 in use after the electrolyte refilling. Therefore, the appearance of the secondary battery cell 400 remains the same as before the electrolyte refilling, without affecting the use of the battery cell after the electrolyte refilling. Moreover, because the first through-hole 21 is closed by directly rotating the cover body 32, the sealing of the first through-hole 21 is implemented without laser welding, thereby saving a step of cleaning the first through-hole 21 before the laser welding, and improving the production efficiency of the battery cell 400. In addition, the first through-hole 21 is opened and closed by rotating the cover body 32, thereby reducing the large external force exerted on the pressure relief component 2 along the thickness during detachment and attachment of the cover body 32, and preventing the pressure relief component 2 from deforming inward or outward.

In some embodiments, an accommodation portion 23 is further disposed on the pressure relief component 2. The accommodation portion 23 is disposed on the pressure relief component 2 and disposed along a circumference of the first through-hole 21. The cover body 32 includes a limiting portion 322. A snap-fit structure is formed between the limiting portion 322 and the accommodation portion 23. When the cover body 32 rotates to a first position, the limiting portion 322 is located in the accommodation portion 23 to restrict the cover body 32 from detaching from the pressure relief component 2. When the cover body 32 rotates to a second position, the limiting portion 322 is staggered from the accommodation portion 23 along the circumference of the first through-hole 21 to implement detachment between the cover body 32 and the pressure relief component 2. Optionally, the cover body 32 may be detachably connected to the pressure relief component 2 by means such as screwing, snap-fastening, or the like instead.

In this embodiment, an extension length of the limiting portion 322 along the circumference of the first through-hole 21 and an extension width along the radius of the first through-hole 21 ensure sufficient strength of the snap-fit structure. The strength is enough to prevent the snap-fit structure from being damaged even if the structure has been detached and attached for many times, so as to ensure reliability and a relatively long service life of the battery cell 400 in use.

Moreover, the limiting portion 322 fits with or detaches from the accommodation portion 23 by rotating the cover body 32. Therefore, the structure is simple, the requirement on the fitting precision is relatively low, and the cover body is reusable. With respect to assembling and maintenance, the cover body 32 is easy to detach and attach, thereby improving the assembling efficiency of the battery cell 400 during production, and shortening the maintenance time during electrolyte refilling.

Further, as shown in FIG. 4, the accommodation portion 23 is located on a side that is of the pressure relief component 2 and that is away from the housing 40, and is disposed along the circumference of the first through-hole 21. The accommodation portion 23 may be a cavity extending along a part of the circumference of the first through-hole 21. The accommodation portion 23 is at a preset distance from a surface that is of the pressure relief component 2 and that is close to the interior of the battery cell 400. The preset distance is not limited. For example, the accommodation portion 23 may be disposed in an upper region, a central region, or a lower region of the pressure relief component 2, so that at least a part of the pressure relief component 2 is located between the accommodation portion 23 and the electrode assembly 30.

The cover body 32 is restricted from approaching, or detached from, the accommodation portion 23 by rotating. During the rotation, the limiting portion 322 may rub against an inner wall of the accommodation portion 23 to generate metal particles. In this disclosure, the accommodation portion 23 is located on the side that is of the pressure relief component 2 and that is away from the interior of the battery cell 400. Therefore, the metal particles generated during the rotation is prevented from directly falling into the housing 40 to cause a short circuit of the battery cell 400, thereby further improving safety of the battery cell 400. Optionally, the accommodation portion 23 may be directly disposed on a bottom face of the pressure relief component 2 instead.

In some embodiments, the cover body 32 further includes a body portion 321. The body portion 321 is configured to cover at least a part of the sealing element 31. The limiting portion 322 is connected to the body portion 321 and extends along a radius of the first through-hole 21.

Figure 11:
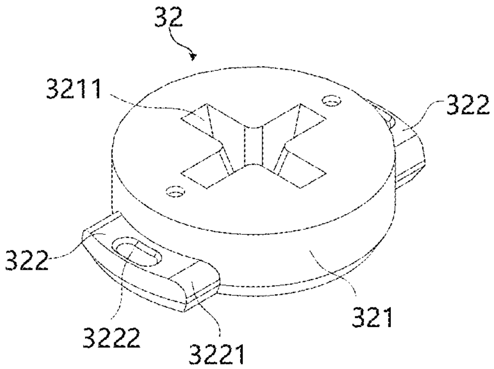
FIG. 11 is a schematic structural diagram of a cover body according to a first embodiment.

In some embodiments, as shown in FIG. 5 and FIG. 11, the cover body 32 further includes a body portion 321 configured to cover at least a part of the sealing element 31. For example, the body portion 321 may take the shape of a disc-like or annular structure, or the like. The limiting portion 322 is connected to the body portion 321, and extends along the radius of the first through-hole 21. The limiting portion 322 may extend radially inward or outward depending on the form of fit between the cover body 32 and the pressure relief component 2. For example, the limiting portion 322 may be a boss extending along the circumference of the body portion 321. The shape of a cross section of the boss fits the accommodation portion 23.

As shown in FIG. 11, a plurality of limiting portions 322 are disposed. The plurality of limiting portions 322 are spaced out along the circumference of the body portion 321. Correspondingly, a plurality of accommodation portions 23 are disposed, and the plurality of limiting portions 322 are in one-to-one correspondence with the plurality of accommodation portions 23. In FIG. 11, two limiting portions 322 are shown. The two limiting portions 322 are disposed opposite to each other with respect to the center of the body portion 321.

Figure 10A:
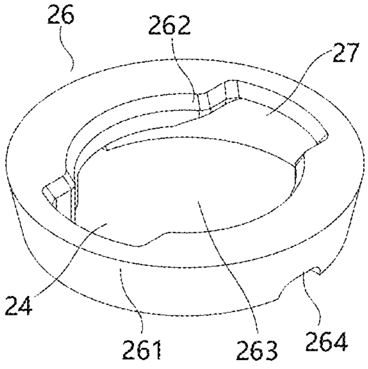
FIG. 10A and FIG. 10B are schematic structural diagrams of a front side and a front side, respectively, of a mounting component according to a first embodiment.
Figure 10B:
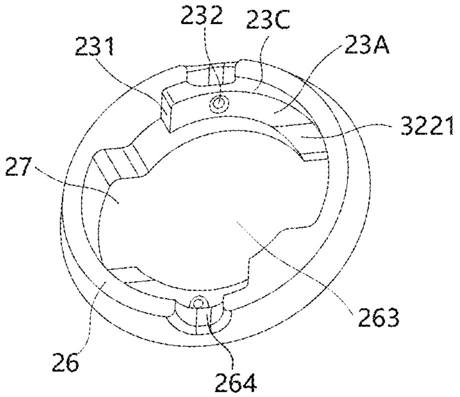

In some embodiments, as shown in FIG. 10A and FIG. 10B, the pressure relief component 2 further includes a guide portion 27. The guide portion 27 communicates with the accommodation portion 23. The limiting portion 322 is configured to enter the accommodation portion 23 through the guide portion 27, or detach from the pressure relief component 2 through the guide portion 27. For example, a plurality of accommodation portions 23 are disposed circumferentially, and the guide portion 27 is an opening region formed between adjacent accommodation portions 23. When the cover body 32 is in the second position, the limiting portion 322 is staggered from the accommodation portion 23 circumferentially, and located inside the guide portion 27. Alternatively, just one accommodation portion 23 is disposed circumferentially, and the guide portion 27 is an opening region other than the accommodation portion 23 on the circumference.

In some embodiments, as shown in FIG. 5, the accommodation portion 23 includes a first limiting wall 23A, a second limiting wall 23B opposite to the first limiting wall 23A, and a sidewall 23C configured to connect the first limiting wall 23A and the second limiting wall 23B.

As shown in FIG. 5, when the cover body 32 rotates to the first position, the first limiting wall 23A abuts against the limiting portion 322. The first limiting wall 23A is a top wall, and can limit freedom of upward movement of the cover body 32 along the height direction, so as to restrict the cover body 32 from detaching from the pressure relief component 2. The second limiting wall 23B is a bottom wall. The second limiting wall 23B is at a preset distance from a surface that is of the pressure relief component 2 and that is close to the interior of the battery cell 400. To reduce a resistance of rotating the cover body 32, a clearance may exist between the second limiting wall 23B and the limiting portion 322. Optionally, the second limiting wall 23B may also abut against the limiting portion 322. Similarly, to reduce the resistance of rotating the cover body 32, a clearance may also exist between the sidewall 23C and the limiting portion 322. Optionally, the sidewall 23C may be in contact with the limiting portion 322.

When the cover body 32 needs to be mounted, a downward force is exerted on the cover body 32. A clearance is generated between the limiting portion 322 and the first limiting wall 23A through deformation of the sealing element 31. In this case, the cover body 32 is rotated to make the limiting portion 322 enter the accommodation portion 23 smoothly. After reaching the first position, the cover body 32 is released. The cover body 32 moves upward under an elastic action of the sealing element 31 until a top face of the limiting portion 322 abuts against the first limiting wall 23A. In this case, a clearance may appear between the bottom face of the limiting portion 322 and the second limiting wall 23B.

When the cover body 32 needs to be detached, a downward force is exerted on the cover body 32. A clearance is generated between the limiting portion 322 and the first limiting wall 23A through deformation of the sealing element 31. In this case, the cover body 32 is rotated so that the limiting portion 322 is smoothly staggered from the accommodation portion 23 circumferentially and integrally located inside the guide portion 27. In this case, the cover body 32 reaches the second position, and is removed for electrolyte injection.

In some embodiments, a stop portion 231 is disposed inside the accommodation portion 23, and is configured to limit a maximum rotational stroke of the limiting portion 322. One stop portion 231 may be disposed on each accommodation portion 23. The stop portion 231 can block the rotation of the limiting portion 322 to prevent the limiting portion 322 from directly spinning out of the accommodation portion 23.

When the maximum rotational stroke is reached, a side of the limiting portion 322 along the circumference fits the stop portion 231 exactly. For example, two limiting portions 322 are disposed evenly along the circumference of the body portion 321. Both sides of the limiting portion 322 along the circumference are parallel to a center plane of the cover body 32. Correspondingly, the stop portions 231 of the two accommodation portions 23 are centrosymmetric about a center plane of the first through-hole 21. The two stop portions 231 are parallel to each other. Optionally, the side of the limiting portion 322 along the circumference may partially abut against the stop portion 231 instead.

In some embodiments, a limiting structure is disposed between the limiting portion 322 and the accommodation portion 23, and is configured to restrict the cover body 32 from being staggered and detached from the accommodation portion 23 when the cover body is in the first position. If the device that uses the battery cell 400 generates a large vibration or impact during operation, the limiting structure can implement a reliable snap-fit between the limiting portion 322 and the accommodation portion 23 when the cover body is in the first position, thereby preventing the limiting portion 322 from detaching from the accommodation portion 23 due to circumferential rotation, making the connection between the cover body 32 and the pressure relief component 2 more reliable, improving airtightness of the electrolytic solution, and in turn, ensuring reliability of the battery in use.

As shown in FIG. 10B and FIG. 11, the limiting structure includes: a limiting opening 3222 and a second protruding portion 232. The limiting opening 3222 is disposed on one of the limiting portion 322 or the accommodation portion 23. For example, the limiting opening 3222 may be a hole or slot, or the like. The second protruding portion 232 is snap-fitted to the limiting opening 3222, and is disposed on the other of the limiting portion 322 or the accommodation portion 23. When the cover body 32 is in the first position, under the elastic action of the sealing element 31, the limiting opening 3222 is snap-fitted to the second protruding portion 232 tightly to prevent the limiting portion 322 from detaching from the accommodation portion 23 due to rotation caused by an external force such as vibration or impact; or, the cover body 32 implements tight fastening through an interference-fit between the limiting opening 3222 and the second protruding portion 232.

As shown in FIG. 10B, the second protruding portion 232 is disposed on the first limiting wall 23A of the accommodation portion 23, and the second protruding portion 232 is a cylinder. As shown in FIG. 11, a limiting opening 3222 is disposed on a top face of the limiting portion 322. The limiting opening 3222 is a circular hole or an arc-shaped oblong hole. When the cover body 32 is in the first position, the cylinder is embedded into the circular hole or the arc-shaped oblong hole to limit the rotation of the cover body 32.

As shown in FIG. 4, along an axial projection of the first through-hole 21, a maximum diameter of the sealing element 31 is greater than a minimum diameter of the first through-hole 21. This structure can prevent the sealing element 31 from entering the housing 40 through the first through-hole 21 during assembling or electrolyte refilling. The sealing element 31 may be a sealing strip, a sealing pin, a sealing ring, or the like.

Figure 12:
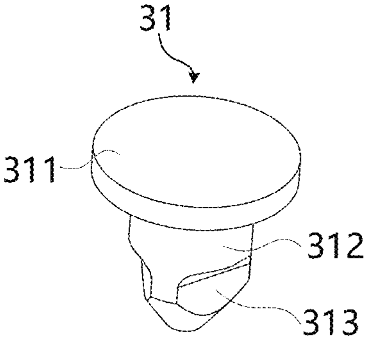
FIG. 12 is a schematic structural diagram of a sealing element according to a first embodiment.

As shown in FIG. 4 and FIG. 12, the sealing element 31 includes a sealing rod 312 and a locking portion 311 connected to one end of the sealing rod 312. The sealing rod 312 is inserted into the first through-hole 21. For example, the sealing rod 312 is in tight fit with the first through-hole 21 to improve the sealing effect for the electrolytic solution. The locking portion 311 is radially disposed and abuts against the pressure relief component 2. To insert the sealing rod 312 into the first through-hole 21, a guide portion 313 is disposed at an end that is of the sealing rod 312 and that is away from the locking portion 311.

Such a sealing element 31 alone can seal the first through-hole 21. In a case of electrolyte refilling, the first through-hole 21 is still closed by the sealing element 31 after the cover body 32 is detached, and finally, the electrolytic solution can be injected by just detaching the sealing element 31. In a case of mounting the cover body 32, the first through-hole 21 is closed by the sealing element 31 first, and then the cover body 32 is mounted. In this way, during both detachment and attachment of the cover body 32, the first through-hole 21 is in a closed state, thereby further preventing a positive electrode and a negative electrode of the electrode assembly 30 from being short-circuited by metal chips that fall into the housing 40, where the metal chips are generated by friction between the cover body 32 and the accommodation portion 23 during rotation of the cover body. Therefore, relatively high working performance of the battery cell 400 is ensured.

To facilitate rotation of the cover body 32, a clamping portion 3211 is disposed on the body portion 321 of the cover body 32, and is configured to receive an external operation to drive the cover body 32 to rotate. By virtue of the clamping portion 3211 disposed, the tooling can coordinate with the clamping portion 3211 to rotate the cover body 32 conveniently, an external force can be applied conveniently to detach and attach the cover body 32, and a rotation angle of the cover body 32 is easily controllable. As shown in FIG. 11, the clamping portion 3211 includes a cross recess. Alternatively, the clamping portion 3211 includes a plurality of holes made on the body portion 321.

In some embodiments, as shown in FIG. 3 to FIG. 5, the pressure relief component 2 includes a pressure relief body 25 and a mounting component 26. The mounting component 26 is disposed on a surface of the pressure relief body 25 and disposed around the first through-hole 21. For example, the mounting component 26 may be disposed a surface that is of the pressure relief body 25 and that is away from the housing 40. The accommodation portion 23 is disposed in the mounting component 26, or the accommodation portion 23 is formed by being enclosed with the mounting component 26 and the pressure relief body 25.

In this embodiment, the pressure relief component 2 is designed as a discrete structure. The pressure relief component 2 is in a thin plate-like structure on which a complex structure is hardly processible. Therefore, the mounting component 26 disposed facilitates formation of the accommodation portion 23, and reduces the processing difficulty of the pressure relief component 2.

As shown in FIG. 5, the accommodation portion 23 is formed by being enclosed with the mounting component 26 and the pressure relief body 25. As shown in FIG. 10A, the mounting component 26 includes a mounting ring 261 and a limiting base 262. The limiting base 262 is connected to an inner wall of the mounting ring 261 and extends radially inward. The mounting ring 261 is fixed onto the pressure relief body 25. An accommodation portion 23 is formed between the limiting base 262 and the pressure relief body 25. A bottom face of the limiting base 262 serves as a first limiting wall 23A.

As shown in FIG. 5, a third groove 251 is disposed on a surface that is of the pressure relief body 25 and that is away from the housing 40. The mounting component 26 is fixed in the third groove 251. The first through-hole 21 is made on a bottom wall of the third groove 251. The accommodation portion 23 is formed on an inner sidewall of the mounting component 26.

Such a structure can reduce the height of the mounting component 26 relative to the pressure relief body 25, so as to reduce the height by which the closing component 3 protrudes from the pressure relief body 25, and in turn, reduce the overall height of the battery. In addition, this can reduce the probability of collision between the closing component 3 and other components during mounting or use of the battery cell 400.

Specifically, the mounting component 26 may be fixed in the third groove 251 in various ways such as tight fit, bonding, fastener, or welding. As shown in FIG. 5, the accommodation portion 23 is formed on an inner sidewall of the mounting component 26. The cover body 32 further includes a body portion 321 configured to cover at least a part of the sealing element 31. The body portion 321 is located in an opening 263 that is formed by enclosing the first through-hole 21 with the mounting component 26. The opening 263 communicates with the accommodation portion 23. The limiting portion 322 is connected to an outer sidewall of the body portion 321 and extends along a radius of the first through-hole 21.

In this embodiment, the cover body 32 is disposed in the opening 263, thereby helping reduce the height by which the closing component 3 protrudes from the pressure relief body 25. This not only reduces the probability of collision between the closing component 3 and other components during the mounting or use of the battery cell 400, but also facilitates mounting of other members above the end cap assembly 10, such as a detection circuit configured to obtain a signal of the battery cell 400, in a case that the battery cell 400 is applied to a battery 200.

Specifically, as shown in FIG. 10A and FIG. 10B, the mounting component 26 includes a mounting ring 261 and a limiting base 262. The limiting base 262 is connected to an inner wall of the mounting ring 261. The limiting base 262 may be disposed at an end that is of the mounting ring 261 and that is away from the first through-hole 21, so as to leave a space for forming the accommodation portion 23 in the height direction. The limiting base 262 is flush with a surface that is of the mounting ring 261 and that is away from the first through-hole 21, so as to maximally increase the height of the accommodation portion 23, and correspondingly, increase the thickness of the limiting portion 322, and in turn, increase snap-fit strength between the limiting portion 322 and the accommodation portion 23. An opening 263 is formed in an internal region that is formed by being enclosed with a plurality of limiting bases 262 in the mounting component 26. The body portion 321 is located in the opening 263. The opening 263 communicates with the accommodation portion 23.

The mounting component 26 is disposed in a third groove 251, and the accommodation portion 23 is formed by being enclosed with a bottom wall of the limiting base 262, a sidewall of the mounting ring 261, and a bottom wall of the third groove 251. Therefore, the bottom wall of the limiting base 262 serves as a first limiting wall 23A, the bottom wall of the third groove 251 serves as a second limiting wall 12B, and the sidewall of the mounting ring 261 serves as a sidewall 12C.

The limiting base 262 may extend radially inward from an inner sidewall of the mounting ring 261, and the limiting base 262 extends circumferentially. For example, a plurality of limiting bases 262 are disposed circumferentially at intervals on the mounting ring 261. The plurality of limiting bases 262 may be evenly distributed. A guide portion 27 is formed between adjacent limiting bases 262. The guide portion 27 communicates with the accommodation portion 23. In some embodiments, as shown in FIG. 10B, a beveled face 3221 is disposed on at least one of the limiting base 262, the first limiting wall 23A, or the second limiting wall 23B, and is configured to guide the limiting base 262 into the accommodation portion 23. In this structure, the beveled face 3221 disposed enables the limiting base 262 to smoothly enter the accommodation portion 23, without a need to align and adjust the limiting base 262 to a specified height. This can improve the assembling efficiency and prevent collision between the limiting base 262 and an entrance of the accommodation portion 23, thereby increasing the service life of the closing component 3 and reducing metal chips generated. The beveled face 3221 may be a flat face or an arc face, or the like.

Specifically, as shown in FIG. 10B, a beveled face 3221 is disposed on the limiting base 262, and is configured to guide the limiting base 262 into the accommodation portion 23. The beveled face 3221 disposed on the limiting base 262 facilitates processing.

As shown in FIG. 5, a fourth groove 323 is made on a surface that is of the cover body 32 and that is oriented toward the interior of the battery cell 400. The locking portion 311 of the sealing element 31 is located in the fourth groove 323.

As shown in FIG. 5, during rotation of the cover body 32, in order to reduce collision between the limiting base 262 and the accommodation portion 23, a downward force may be exerted on the cover body 32 to reduce the height of the limiting base 262 and facilitate smooth entry into the accommodation portion 23. However, if excessive, the force may crush the sealing element 31. With the fourth groove 323, the bottom face of the cover body 32 abuts against the pressure relief body 25 when the downward force is excessive. A maximum amount of compression of the sealing element 31 is the height of the fourth groove 323, thereby preventing deteriorated sealing effects of the sealing element 31 crushed by the amount of compression of the sealing element 31 in excess of the bearing capacity under an excessive force.

As shown in FIG. 5, a top face of the mounting component 26 does not exceed a top face of the pressure relief body 25. For example, the two top faces are flush. Moreover, at least a part of the sealing element 31 is disposed in the fourth groove 323, so that the top face of the cover body 32 does not exceed the top face of the mounting component 26. In this way, the closing component 3 is prevented from being higher than the top face of the pressure relief body 25 and the top face of the end cap body 1.

Such a structure can reduce the overall height of the battery cell 400, increase the energy density, and reduce the probability of collision between the closing component 3 and other components during mounting or use of the battery cell 400.

To facilitate the limiting base 262 to enter the accommodation portion 23 by rotating, the height of the accommodation portion 23 is greater than that of the limiting base 262. After the limiting base 262 enters the accommodation portion 23, the top face of the limiting base 262 is brought into contact with the first limiting wall 23A under the elastic force of the sealing element 31, but the bottom face of the limiting base 262 is spaced from the second limiting wall 23B by a clearance. Therefore, in order to prevent the top face of the cover body 32 from exceeding the top face of the mounting component 26, the height of the cover body 32 is less than the height of the mounting component 26. Such a structure not only enables the cover body 32 to rotate smoothly, but also leaves a space for the mounting of the sealing element 31 on the basis of reducing the overall height of the battery.

The specific structure of each embodiment is described in detail below.

FIG. 2 to FIG. 12 are schematic structural diagrams of an end cap assembly 10 according to a first embodiment of this disclosure. As shown in FIG. 2, a pressure relief component 2 is integrated with an end cap body 1, and is located between two terminals 5. The pressure relief component 2 includes a single explosion-proof valve 22. A first through-hole 21 configured to injecting an electrolytic solution is disposed at a center position of the explosion-proof valve 22. The first through-hole 21 is closed by a detachable closing component 3. A fragile region 224 is disposed on the pressure relief component 2. The fragile region 224 includes a thinned portion. The thinned portion includes a nick that is disposed around, and coaxial with, the first through-hole 21. The nick is disposed on a surface that is of the pressure relief component 2 and that is away from the interior of the battery cell 400. For example, the nick may be formed by stamping.

In order for the pressure relief component 2 to both facilitate arrangement of the thinned portion and ensure sufficient strength of connection to the closing component 3, as shown in FIG. 4, the explosion-proof valve 22 includes a first portion 221 and a second portion 222. The first portion 221 is an annular structure. The fragile region 224 is disposed in the first portion 221. The second portion 222 is disposed inside the first portion 221 along a radius of the explosion-proof valve 22. A thickness of the second portion 222 is greater than a thickness of the first portion 221. The first through-hole 21 is located at the center position of the explosion-proof valve 22. Correspondingly, the second portion 222 is also located at the center position of the explosion-proof valve 22, and the first through-hole 21 is made in the second portion 222. The explosion-proof valve 22 may further include a transition portion 223. The transition portion 223 takes the shape of an annular structure, and is connected between the first portion 221 and the second portion 222 along the radius of the explosion-proof valve 22.

As shown in FIG. 3, the closing component 3 includes a sealing element 31 and a cover body 32. The sealing element 31 is configured to seal the first through-hole 21. The cover body 32 covers the sealing element 31, and the cover body 32 is configured to be detachable by rotating. During detachment and attachment of the cover body 32, an external force is inevitably exerted on the pressure relief component 2. For example, a downward pressure, an upward pulling force, or a circumferential rotational force is exerted on the pressure relief component 2. The external force so exerted on the pressure relief component 2 may damage the fragile region 224.

To solve such a problem, as shown in FIG. 3, the end cap assembly 10 further includes an insulation piece 4. The insulation piece 4 is disposed on a side that is of the end cap body 1 and that is close to the interior of the battery cell 400, and abuts on the pressure relief component 2 to support the pressure relief component 2. Specifically, a first groove 41 is made on a surface that is of the insulation piece 4 and that is oriented toward the end cap body 1. The second portion 222 extends into the first groove 41 to reduce the thickness of the end cap assembly 10. The second portion 222 abuts on a bottom face of the first groove 41. A plurality of second through-holes 43 are made on the bottom face of the first groove 41 to form a passageway available for the gas inside the battery cell 400 to reach the fragile region 224. In this way, when the internal pressure of the battery cell 400 exceeds the threshold, the internal pressure or heat can be smoothly released through the explosion-proof valve 22, thereby improving safety of battery cell 400 in use.

Further, as shown in FIG. 7 and FIG. 8, a snap-fit structure is disposed between the pressure relief component 2 and the insulation piece 4. The snap-fit structure is configured to limit torsional deformation of the pressure relief component 2 with respect to the end cap body 1 along a circumference of the pressure relief component 2. Specifically, the snap-fit structure includes a first protruding portion 225 and a recessed portion 42 that are in fit with each other, for example, in transition fit or tight fit with each other. The first protruding portion 225 is disposed on a surface that is of the pressure relief component 2 and that is oriented toward the insulation piece 4. The recessed portion 42 is disposed on a bottom face of the first groove 41.

As shown in FIG. 3 to FIG. 5, an accommodation portion 23 is further disposed on the pressure relief component 2. The accommodation portion 23 is disposed on the pressure relief component 2 and disposed along a circumference of the first through-hole 21. The cover body 32 includes a limiting portion 322. A snap-fit structure is formed between the limiting portion 322 and the accommodation portion 23. When the cover body 32 rotates to a first position, the limiting portion 322 is located in the accommodation portion 23 to restrict the cover body 32 from detaching from the pressure relief component 2. When the cover body 32 rotates to a second position, the limiting portion 322 is staggered from the accommodation portion 23 along the circumference of the first through-hole 21 to implement detachment between the cover body 32 and the pressure relief component 2.

The accommodation portion 23 is located on a side that is of the pressure relief component 2 and that is away from the housing 40, and is disposed along the circumference of the first through-hole 21. The accommodation portion 23 may be a cavity extending along a part of the circumference of the first through-hole 21. As shown in FIG. 5, the accommodation portion 23 includes a first limiting wall 23A, a second limiting wall 23B opposite to the first limiting wall 23A, and a sidewall 23C configured to connect the first limiting wall 23A and the second limiting wall 23B.

Figure 6:
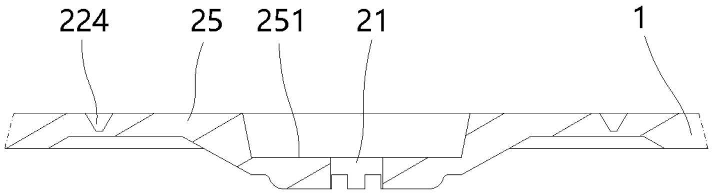
FIG. 6 is a schematic structural diagram of a pressure relief component integrated with an end cap body according to a first embodiment.

As shown in FIG. 3 to FIG. 5, the pressure relief component 2 includes a pressure relief body 25 and a mounting component 26. The mounting component 26 is disposed on a surface of the pressure relief body 25 and disposed around the first through-hole 21. As shown in FIG. 6, a third groove 251 is disposed on a surface of the pressure relief body 25. The mounting component 26 is fixed in the third groove 251. The first through-hole 21 is made on a bottom wall of the third groove 251. The accommodation portion 23 is formed on an inner sidewall of the mounting component 26.

As shown in FIG. 11, the cover body 32 includes a body portion 321 and a limiting portion 322 connected to an outer sidewall of the body portion 321. The body portion 321 is configured to cover the sealing element 31. The limiting portion 322 is connected to the outer sidewall of the body portion 321 and extends along the radius of the first through-hole 21. The limiting portion 322 is in fit with the accommodation portion 23.

A process of assembling the end cap assembly 10 according to a first embodiment is as follows: first, placing a mounting component 26 into a third groove 251, and welding; next, injecting an electrolytic solution from a first through-hole 21, and mounting a sealing element 31 upon completion of injection; subsequently, placing a cover body 32 onto a pressure relief component 2, where the cover body 32 covers at least a part of the sealing element 31, and the cover body 32 is placed in a second position where the limiting portion 322 is circumferentially staggered from the accommodation portion 23; finally, engaging a cross-recess-shaped clamping portion 3211 by using a special tool, applying a downward force to generate a clearance between the limiting portion 322 and the first limiting wall 23A, and rotating 90° to move the cover body 32 from the second position to a first position and cause the limiting portion 322 to enter the accommodation portion 23, so as to restrict the cover body 32 from detaching from the pressure relief component 2. After rotating in place, releasing the cover body 32, so that the cover body 32 abuts on the first limiting wall 23A after the cover body 32 receives an elastic force of the sealing element 31.

An electrolyte refilling process for the battery cell 400 is: engaging the cross-recess-shaped clamping portion 3211 by using a special tool, reversely rotating the cover body 32 until the cover body moves from the first position to the second position, removing the cover body 32, removing the sealing element 31, and, after the electrolytic solution e is injected, repeating the assembling process to finish maintenance for the battery cell 400.

FIG. 13 to FIG. 16B are schematic structural diagrams of an end cap assembly 10 according to a second embodiment of this disclosure. Differences from the first embodiment are: as shown in FIG. 14, a third through-hole 12 is made on the end cap body 1, and the pressure relief component 2 is fixed inside the third through-hole 12. For example, the pressure relief component 2 may be fixed inside the third through-hole 12 by welding. The pressure relief component 2 may be formed by stamping. In order to improve the connection strength between the pressure relief component 2 and the end cap body 1, an annular boss 13 may be disposed on the periphery of the third through-hole 12 to increase the height of the third through-hole 12.

As shown in FIG. 14, an outer rim of the pressure relief component 2 is connected to the end cap body 1. When a screwing force is applied to the cover body 32 for detachment and attachment, an external force is applied to a joint. In addition, after the battery cell 400 has been in use for a long period, the strength of the joint between the pressure relief component 2 and the end cap body 1 decreases. Therefore, a plurality of positioning holes 226 are made circumferentially at intervals on an outer surface of the pressure relief component 2. The positioning holes 226 are configured to assist in positioning the pressure relief component 2 when the closing component 3 closes the first through-hole 21. During assembling of the end cap assembly 10 or electrolyte refilling, tooling may be inserted into a positioning hole 226 to provide a clamping force for the pressure relief component 2, so as to reduce the external force received by the pressure relief component 2 along the thickness or circumference of the pressure relief component 2, prevent the pressure relief component 2 from being stressed at the actuation mechanism or fragile structure, and improve the structural stability of the pressure relief component 2.

As shown in FIG. 15, a locking base 121 is disposed on a hole wall of the third through-hole 12. The locking base 121 is disposed on a side that is of the end cap body 1 and that is close to an interior of the battery cell 400. The pressure relief component 2 abuts against the locking base 121 to connect to the end cap body 1. The air pressure inside the battery cell 400 acts from inside to outside. Therefore, in this embodiment, the pressure relief component 2 abuts against the locking base 121 from inside. The locking base 121 may serve as a main body for bearing the air pressure, thereby reducing the force on the joint between the pressure relief component 2 and the end cap body 1, reducing the probability of seal failure caused by a creep of the joint between the pressure relief component 2 and the end cap body 1 after long-term use of the battery cell 400, and increasing the service life of the battery cell 400.

As shown in FIG. 15, the end cap assembly 10 further includes a protection sheet 6. The protection sheet 6 is affixed to a surface that is of the pressure relief component 2 and that is away from the interior of the battery cell 400, so as to prevent external impurities or moisture from entering the battery cell 400 through the closing component 3, thereby improving airtightness of the end cap assembly 10.

FIG. 17 is a variation of the second embodiment. Differences from the second embodiment are: the locking base 121 is disposed on a side that is of the end cap body 1 and that is away from the interior of the battery cell 400, and the pressure relief component 2 abuts against the locking base 121 to connect to the end cap body 1. The second portion 222 is at a preset distance from the bottom face of the first groove 41. In this embodiment, the pressure relief component 2 can be disposed close to the outer side of the end cap assembly 10, thereby increasing the energy density of the battery cell 400.

FIG. 18 to FIG. 20 are schematic structural diagrams of an end cap assembly 10 according to a third embodiment of this disclosure. Differences from the first embodiment and the second embodiment are: as shown in FIG. 18, the pressure relief component 2 includes a plurality of explosion-proof valves 22, and the plurality of explosion-proof valves 22 are disposed independently at intervals along the periphery of the first through-hole 21. The pressure relief component 2 is defined as a part enclosed by the outer rims of a plurality of explosion-proof valves 22. For example, a plurality of explosion-proof valves 22 are distributed at equal intervals, so that the pressure relief component 2 is equally stressed at all positions on the circumference. The number of explosion-proof valves 22 may be two, three, four, or more, and each explosion-proof valve 22 may be an arc-shaped groove.

The first through-hole 21 and the explosion-proof valve 22 are disposed independently. Therefore, the thickness of a joint between the first through-hole 21 and the explosion-proof valve 22 is consistent with the thickness of the end cap body 1, thereby ensuring sufficient structural strength of the joint. In addition, the fragile region 224 of the explosion-proof valve 22 is independent of the electrolyte injection mechanism, so that the external force generated during detachment and attachment of the closing component 3 is prevented from directly acting on the explosion-proof valve 22 during the assembling of the end cap assembly 10 or the electrolyte refilling, and the fragile region 224 of the explosion-proof valve 22 is prevented from being deformed or damaged.

In some embodiments, as shown in FIG. 18 and FIG. 19, a plurality of second grooves 24 are made on the pressure relief component 2. A part of the pressure relief component 2 in the thickness direction, which is other than the second groove 24, forms the explosion-proof valve 22. The second groove 24 may be disposed on a surface that is of the pressure relief component 2 and that is away from the interior of the battery cell 400. As shown in FIG. 20, the explosion-proof valve 22 includes a fragile region 224. The fragile region 224 includes a thinned portion. For example, the thinned portion includes a nick extending along at least a part of the circumference of the explosion-proof valve 22. The nick is made on the bottom face of the second groove 24, or the nick is made in a region located on an inner side of the pressure relief component 2 and corresponding to the second groove 24.

Figures 21, 22:
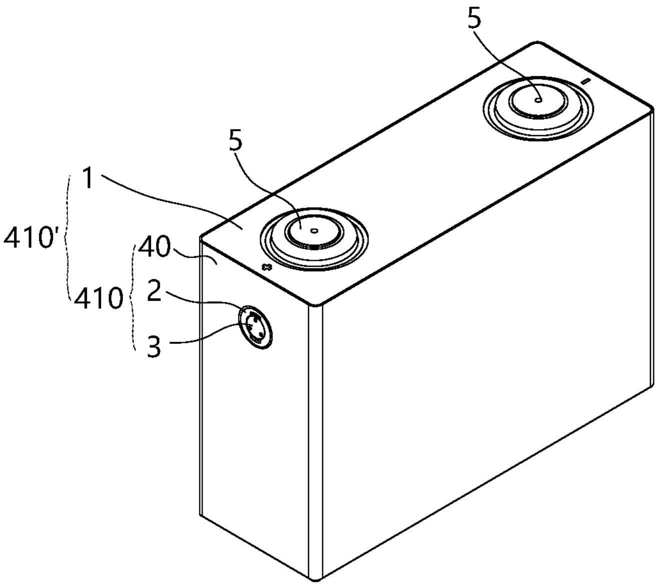
FIG. 21 is a schematic structural diagram of a shell of a battery cell according to some embodiments of this disclosure.
FIG. 22 is a schematic flowchart of an electrolyte injection method of a battery cell according to some embodiments of this disclosure.

Based on the improvements made by the foregoing embodiments on the end cap assembly 10, another aspect of this disclosure further provides a housing assembly 410 applicable to a battery cell 400. In some embodiments, as shown in FIG. 21, the housing assembly 410 includes: a housing 40, a pressure relief component 2, and a closing component 3. The pressure relief component 2 is connected to a sidewall of the housing 40. A first through-hole 21 configured to inject an electrolytic solution is made on the pressure relief component 2. The pressure relief component 2 is configured to be actuated when an internal pressure of the battery cell 400 reaches a threshold, so as to release the internal pressure of the battery cell 400. The closing component 3 is detachably disposed on the housing 40. The closing component 3 is configured to close the first through-hole 21.

In this embodiment, the first through-hole 21 may be disposed on any wall face of the housing 40, so that the first through-hole 21 can be located more flexibly. As shown in FIG. 1-D, a lithium battery is relatively small in size, and a terminal 5 is disposed on the end cap body 1, or an end cap temperature acquisition structure is disposed in other structures. Therefore, the remaining area on the end cap body 1 is relatively small. If the first through-hole 21 is made on one of surfaces of the housing 40, the area of the pressure relief component 2 is allowed to be increased. On condition that the internal air pressure of the battery cell 400 remains constant, the larger the area of the pressure relief component, the greater the pressure on the pressure relief component 2. In this way, when the battery cell 400 is thermally runaway, the gas in the battery cell 400 can be quickly expelled, thereby improving safety of the battery cell 400 in use. Moreover, such a design facilitates disposition of a detachable connection structure between the closing component 3 and the pressure relief component 2, improves the structural strength of the connection between the closing component 3 and the pressure relief component 2, and improves reliability of sealing the electrolytic solution in a vibration working environment. In addition, a relatively large operating space is made available during detachment and attachment of the closing component 3.

As shown in FIG. 21, the first through-hole 21 is disposed on a wall face that is of the housing 40 and that is adjacent to the end cap body 1, so that the battery cell 400 can be placed steadily with the end cap body 1 facing upward. For example, the first through-hole 21 is disposed on a wall face that is of the housing 40 and that is adjacent to a largest lateral face. In this way, when a plurality of battery cells 400 are stacked flat or vertically to form a battery module 300, adjacent battery cells 400 can still be arranged in such a way that the largest lateral faces of adjacent battery cells 400 keep in contact with each other. Therefore, the battery module 300 is steadier in structure and smaller in size. Descriptions of the pressure relief component 2 and the closing component 3 in FIG. 21 may be obtained by referring to any one of the embodiments described in the section about the end cap assembly 10.

The housing assembly 410 according to this embodiment enables repeated detachment and attachment of the closing component 3 flexibly and conveniently. In a case that the electrolytic solution is deficient or deteriorated, the closing component 3 is conveniently detachable for electrolyte refilling and degassing in the battery cell 400. After completion of the electrolyte refilling, the first through-hole 21 for electrolyte refilling can be closed reliably, thereby ensuring reliability of the battery cell 400 in use after the electrolyte refilling, and the appearance of the battery keeps the same as before the electrolyte refilling.

Moreover, the first through-hole 21 configured to inject an electrolytic solution is disposed on the pressure relief component 2. This is equivalent to integrating the closing component 3 with the pressure relief component 2, thereby not only reducing the area occupied by the closing component 3 and the pressure relief component 2 on the end cap body 1, but also reducing the number of avoidance holes or slots required on tooling and a wiring harness fender during formation of a battery module 300, and in turn, reducing structural complexity of the wiring harness fender and the assembling tool for the battery module 300.

In addition, in the end cap assembly 10 according to this disclosure, the closing component 3 is integrated with the pressure relief component 2, thereby reducing the space occupied by the closing component 3 and the pressure relief component 2 on the end cap body 1 of the end cap assembly 10. Therefore, such an arrangement helps increase the area of the pressure relief component 2 on condition that the area of the end cap body 1 remains constant, and helps increase the pressure on the pressure relief component 2 on condition that the internal air pressure of the battery cell 400 remains constant. In this way, when the battery cell 400 is thermally runaway, the gas in the battery cell 400 can be quickly expelled to avoid the problem that the battery cell 400 explodes due to a degassing amount smaller than a gassing amount, thereby improving safety of the battery cell 400 in use.

In addition, in the end cap assembly 10 according to this disclosure, the first through-hole 21 is made on the pressure relief component 2 instead of making an injection hole by detaching the entire pressure relief component 2. In this way, the radial dimension of the first through-hole 21 is smaller than that of the pressure relief component 2, thereby reducing the size of the closing component 3 on the basis of increasing the area of the pressure relief component 2, and in turn, increasing the energy density of the battery cell 400.

For the embodiments of disposing the pressure relief component 2 and the closing component 3 on other surfaces of the housing 40, refer to the foregoing embodiments of disposing the pressure relief component 2 and the closing component 3 on the end cap body 1, details of which are omitted here.

As shown in FIG. 1-D, another aspect of this disclosure further provides a battery cell 400. In some embodiments, the battery cell 400 includes: an electrode assembly 30 and a shell 410' configured to accommodate the electrode assembly 30. The shell 410' includes a housing 40 and the end cap assembly 10 according to the foregoing embodiments. The housing 40 includes an end opening. The end cap assembly 10 covers the end opening of the housing 40.

Alternatively, as shown in FIG. 21, the battery cell 400 includes an electrode assembly 30 and a shell 410' configured to accommodate the electrode assembly 30. The shell 410' includes an end cap body 1 and the housing assembly 410 according to the foregoing embodiment. The housing 40 includes an end opening, and the end cap body 1 covers the end opening of the housing 40.

As shown in FIG. 22, another aspect of this disclosure provides an electrolyte injection method of a battery cell 400, including:

Step S101: Injecting an electrolytic solution through a first through-hole 21 on a pressure relief component 2 of the battery cell 400, where the pressure relief component 2 is disposed on a sidewall of a shell 410', and the pressure relief component 2 is configured to be actuated when an internal pressure of the battery cell 400 reaches a threshold, so as to release the internal pressure of the battery cell 400; and Step S102: Mounting a closing component 3 onto the pressure relief component 2 to close the first through-hole 21.

Step S102 is performed after step S101. Compared with the conventional method of closing the injection hole by laser welding, this disclosure not only avoids the welding step, but also avoids a plurality of subsequent steps such as cleaning up the weld-induced welding spatters and drying the liquid that remains after the cleaning. Therefore, this disclosure can improve the production efficiency of the battery cell. In this disclosure, the closing component 3 is mounted on the pressure relief component 2 to close the first through-hole 21, and the closing component 3 is integrated with the pressure relief component 2 to achieve space efficiency and facilitate electrolyte refilling operations.

In some embodiments, the closing component 3 includes: a sealing element 31 and a cover body 32. The sealing element 31 is configured to seal the first through-hole 21. The cover body 32 is configured to cover at least a part of the sealing element 31. The mounting a closing component 3 onto the pressure relief component 2 to close the first through-hole 21 in step S102 includes:

Step S102A: Placing the cover body 32 on the pressure relief component 2, where the cover body 32 covers at least a part of the sealing element 31, the cover body 32 is placed in a second position, and a limiting portion 322 of the cover body 32 is staggered, along a circumference of the first through-hole 21, from an accommodation portion 23 located on a side that is of the shell 410' and that is away from an interior of the shell 410'; and Step S102B: Rotating the cover body 32 from the second position to a first position, so that the limiting portion 322 enters the accommodation portion 23 to restrict the cover body 32 from detaching from the pressure relief component 2.

Step S102B is performed after S102A, and these two steps are not shown in the drawing. In this embodiment, the limiting portion 322 is in fit with the accommodation portion 23 through rotation of the cover body 32, which is simple and quick. This can improve the assembling efficiency of the closing component 3 during assembling of the battery cell 400, and in turn, improve production efficiency of the battery cell 400.

Figure 23:
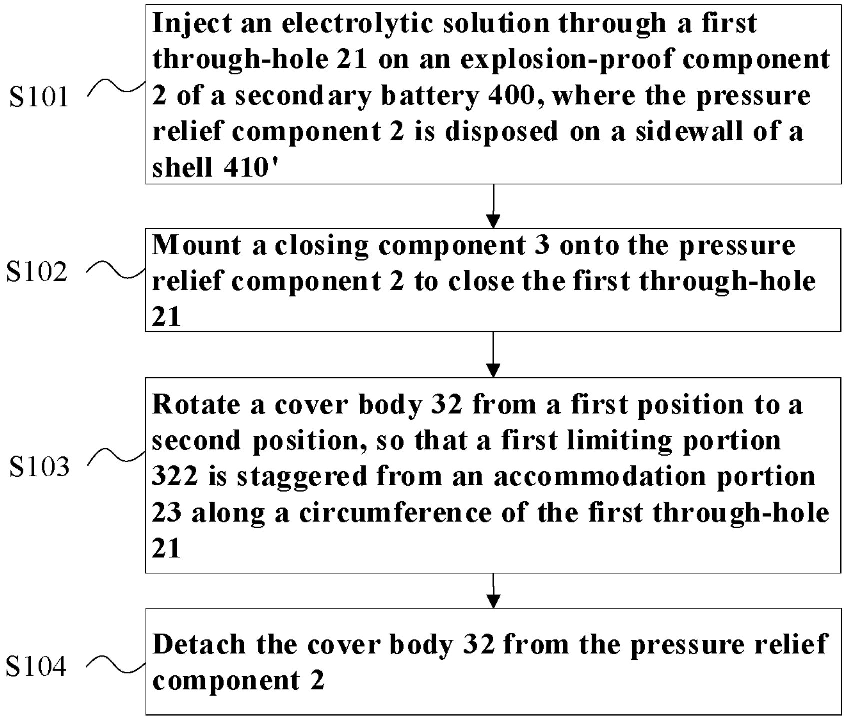
FIG. 23 is a schematic flowchart of an electrolyte injection method of a battery cell according to other embodiments of this disclosure.

In some embodiments, as shown in FIG. 23, the electrolyte injection method according to this disclosure further includes:

Step S103: Rotating the cover body 32 from the first position to the second position, so that the limiting portion 322 is staggered from the accommodation portion 23 along the circumference of the first through-hole 21; and Step S104: Detaching the cover body 32 from the pressure relief component 2.

The conventional method of closing the injection hole by laser welding does not allow electrolyte refilling for the battery. Through steps S103 and S104, this disclosure can implement flexible and convenient detachment of the cover body 32. Therefore, when the electrolytic solution is deficient or deteriorated, the closing component 3 is conveniently detachable for electrolyte refilling or degassing in the battery cell 400. After completion of the injection, the cover body 32 is mounted through steps S102A and S102B, so as to close the first through-hole 21. Through the electrolyte refilling, this disclosure improves the service life of the battery cell 400.

The electrolyte injection method can flexibly and conveniently implement repeated detachment and attachment of the closing component 3, and can reliably close the first through-hole 21 after completion of the electrolyte refilling, thereby ensuring reliability of the battery cell 400 in use after the electrolyte refilling, and keeping the appearance of the battery cell 400 the same as before the electrolyte refilling. In addition, the maintenance time can be shortened during the electrolyte refilling, and the battery cell 400 can be refilled with the electrolytic solution in time in the case of performance deterioration, so as to ensure relatively high working performance of the battery cell 400.

In some embodiments, the electrolyte injection method according to this disclosure further includes:

assisting, during closing of the first through-hole 21, in positioning the pressure relief component 2 through a positioning hole 226 located on an outer surface of the pressure relief component 2.

In this embodiment, during assembling of the battery cell 400 or electrolyte refilling, tooling may be inserted into the positioning hole 226 to provide a clamping force for the pressure relief component 2, so as to reduce the external force received by the pressure relief component 2 along the thickness or circumference of the pressure relief component 2, prevent the pressure relief component 2 from being stressed at the actuation mechanism or fragile structure, and improve the structural stability of the pressure relief component 2.

Figure 24:
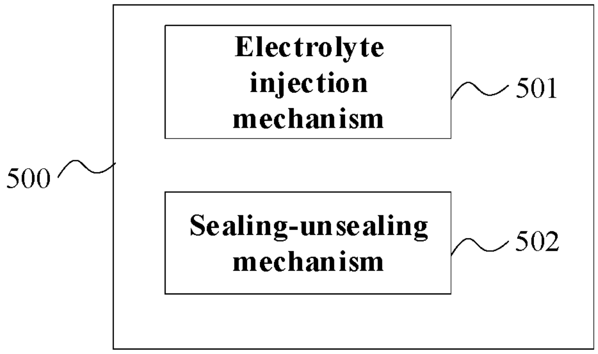
FIG. 24 is a schematic diagram of composition of an electrolyte injection device according to some embodiments of this disclosure.

As shown in FIG. 24, another aspect of this disclosure further provides an electrolyte injection device 500, applicable to a battery cell 400. In some embodiments, the electrolyte injection device 500 includes: an electrolyte injection mechanism 501 and a sealing-unsealing mechanism 502. The electrolyte injection mechanism 501 is configured to inject an electrolytic solution through a first through-hole 21 located on a pressure relief component 2 of the battery cell 400. The pressure relief component 2 is disposed on a sidewall of a shell 410'. The pressure relief component 2 is configured to be actuated when an internal pressure of the battery cell 400 reaches a threshold, so as to release the internal pressure of the battery cell 400. The sealing-unsealing mechanism 502 is configured to mount a closing component 3 onto the pressure relief component 2 to close the first through-hole 21.

Compared with the conventional method of closing the injection hole by laser welding, this disclosure not only avoids the welding step, but also avoids a plurality of steps such as cleaning up the weld-induced welding spatters and drying the liquid that remains after the cleaning. With this device, the battery cell 400 can be manufactured simply and efficiently, thereby improving the assembling efficiency of the battery cell 400.

The patentable subject-matters of this disclosure and features in different embodiments can make reference to each other. To the extent that no structural conflict occurs, a person skilled in the art may combine the technical features in different embodiments flexibly to form more embodiments.

The battery cell end cap assembly, the battery cell, and the electrical device according to this disclosure have been described in detail above. The principles and implementations of this disclosure have been described herein by using specific embodiments. The description of the embodiments is merely intended to help understand the methods and core ideas of this disclosure. It is hereby noted that various improvements and refinements, which may be made by a person of ordinary skill in the art without departing from the principles of this disclosure, fall within the protection scope of the claims of this disclosure.

What is claimed is:

1. An end cap assembly, applicable to a battery cell, the battery cell being a lithium-ion battery cell, wherein the end cap assembly comprises:

an end cap body;

a pressure relief component connected to the end cap body, wherein a first through-hole configured to allow passage of an electrolytic solution injected to the battery cell is made on the pressure relief component, the pressure relief component comprises a pressure relief body and a mounting component, the pressure relief body comprises a groove, a first through hole is made on a bottom wall of the groove, the mounting component is disposed in the groove of the pressure relief body and disposed around the first through-hole, an accommodation portion is formed on an inner sidewall of the mounting component, and the pressure relief component is configured to be actuated when an internal pressure of the battery cell reaches a threshold, so as to release the internal pressure of the battery cell; and a closing component detachably disposed on the pressure relief component, wherein the closing component is configured to close the first through-hole.

2. The end cap assembly according to claim 1, further comprising:

an insulation piece disposed on a side that is of the end cap body and that is close to an interior of the battery cell, wherein the insulation piece abuts on the pressure relief component to support the pressure relief component.

3. The end cap assembly according to claim 2, wherein a snap-fit structure is disposed between the pressure relief component and the insulation piece the snap-fit structure is configured to limit torsional deformation of the pressure relief component with respect to the end cap body along a circumference of the pressure relief component.

4. The end cap assembly according to claim 3, wherein the snap-fit structure comprises a first protruding portion and a recessed portion that fit with each other when stacked together in a height direction, the first protruding portion is disposed on a surface that is of the pressure relief component and that is oriented toward the insulation piece and the recessed portion is disposed on a surface that is of the insulation piece and that is oriented toward the pressure relief component.

5. The end cap assembly according to claim 3, wherein a plurality of snap-fit structures are disposed, and the plurality of snap-fit structures are evenly distributed circumferentially around an axis of the pressure relief component.

6. The end cap assembly according to claim 1, wherein a positioning hole is made on an outer surface of the pressure relief component and the positioning hole is configured to assist in positioning the pressure relief component during closing of the first through-hole.

7. The end cap assembly according to claim 1, wherein the first through-hole is located at a center position of the pressure relief component.

8. An end cap assembly, applicable to a battery cell, the battery cell being a lithium-ion battery cell, wherein the end cap assembly comprises:

an end cap body;

a pressure relief component connected to the end cap body;

a pressure relief component connected to the end cap body, wherein a first through-hole configured to allow passage of an electrolytic solution injected to the battery cell is made on the pressure relief component, and the pressure relief component is configured to be actuated when an internal pressure of the battery cell reaches a threshold, so as to release the internal pressure of the battery cell; and a closing component detachably disposed on the pressure relief component, wherein the closing component is configured to close the first through-hole, wherein the pressure relief component comprises an explosion-proof valve and the first through-hole is disposed on the explosion-proof valve, the explosion-proof valve comprises:

a first portion taking a shape of an annular structure, wherein the first portion comprises a fragile region the fragile region extends along a circumference of the explosion-proof valve and the fragile region is configured to be actuated when the internal pressure of the battery cell reaches the threshold to release the internal pressure of the battery cell; and a second portion disposed inside the first portion along a radius of the explosion-proof valve wherein a thickness of the second portion is greater than a thickness of the first portion, wherein the first through-hole is made in the second portion.

9. The end cap assembly according to claim 8, wherein the explosion-proof valve further comprises: a mounting component disposed in a groove formed in the first portion and disposed on a top wall of the second portion and around the first through-hole.

10. The end cap assembly according to claim 8, wherein the explosion-proof valve further comprises:

a transition portion connected between the first portion and the second portion along the radius of the explosion-proof valve.

11. The end cap assembly according to claim 8, further comprising:

an insulation piece disposed on a side that is of the end cap body and that is close to an interior of the battery cell, wherein a plurality of second through-holes surrounding the first through-hole are made on the insulation piece, and the second through-holes are configured to implement communication between the interior of the battery cell and the fragile region.

12. The end cap assembly according to claim 11, wherein a first groove is made on a surface that is of the insulation piece and that is oriented toward the end cap body and the second portion extends into the first groove.

13. The end cap assembly according to claim 1, wherein the pressure relief component comprises a plurality of explosion-proof valves and the plurality of explosion-proof valves are disposed independently at intervals along a periphery of the first through-hole, and a plurality of second grooves are disposed on the pressure relief component the second grooves form the explosion-proof valves the explosion-proof valves comprise a fragile region and the fragile region is configured to be actuated when the internal pressure of the battery cell reaches the threshold, so as to release the internal pressure of the battery cell.

14. The end cap assembly according to claim 1, wherein a third through-hole is disposed on the end cap body and the pressure relief component is fixed inside the third through-hole, and a locking base is disposed on a hole wall of the third through-hole the locking base is disposed on a side that is of the end cap body and that is close to an interior of the battery cell and the pressure relief component abuts against the locking base to connect to the end cap body.

15. The end cap assembly according to claim 1, further comprising: a protection sheet wherein the protection sheet is affixed to a surface that is of the pressure relief component and that is away from the interior of the battery cell.

16. The end cap assembly according to claim 1, wherein the closing component comprises:

a sealing element configured to seal the first through-hole; and a cover body configured to cover at least a part of the sealing element wherein the cover body is configured to be detachable by rotating.

17. The end cap assembly according to claim 16, wherein the accommodation portion is disposed along a circumference of the first through-hole and the cover body comprises a limiting portion; and when the cover body rotates to a first position, the limiting portion is located in the accommodation portion to restrict the cover body from detaching from the pressure relief component; and, when the cover body rotates to a second position, the limiting portion is staggered from the accommodation portion along the circumference of the first through-hole to implement detachment between the cover body and the pressure relief component.

18. The end cap assembly according to claim 17, wherein the cover body further comprises a body portion the body portion is configured to cover at least a part of the sealing element and the limiting portion is connected to the body portion and extends along a radius of the first through-hole.

19. The end cap assembly according to claim 17, wherein the pressure relief component further comprises a guide portion, the guide portion communicates with the accommodation portion and the limiting portion is configured to enter the accommodation portion through the guide portion or detach from the pressure relief component through the guide portion.

20. A lithium-ion battery cell, comprising:

an electrode assembly and a shell configured to accommodate the electrode assembly, wherein the shell comprises a housing and the end cap assembly according to claim 1, the housing comprises an end opening, and the end cap assembly covers the end opening of the housing.

* * * * *